United States Patent
Gong et al.

(10) Patent No.: US 10,676,363 B2
(45) Date of Patent: Jun. 9, 2020

(54) REDUCED GRAPHENE OXIDE-METAL OXYNITRIDE AEROGEL ELECTRODES

(71) Applicant: Wisconsin Alumni Research Foundation, Madison, WI (US)

(72) Inventors: Shaoqin Gong, Middleton, WI (US); Qifeng Zheng, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 107 days.

(21) Appl. No.: 15/901,352

(22) Filed: Feb. 21, 2018

(65) Prior Publication Data
US 2018/0290891 A1    Oct. 11, 2018

Related U.S. Application Data

(60) Provisional application No. 62/482,348, filed on Apr. 6, 2017.

(51) Int. Cl.
| | |
|---|---|
| *H01G 11/36* | (2013.01) |
| *H01B 1/04* | (2006.01) |
| *B82Y 30/00* | (2011.01) |
| *C01B 32/198* | (2017.01) |
| *C01B 32/23* | (2017.01) |

(Continued)

(52) U.S. Cl.
CPC .......... *C01B 32/198* (2017.08); *B82Y 30/00* (2013.01); *C01B 32/23* (2017.08); *H01B 1/04* (2013.01); *H01G 11/36* (2013.01); *H01G 11/38* (2013.01); *H01G 11/56* (2013.01); *H01G 11/62* (2013.01); *H01G 11/86* (2013.01); *H01M 4/131* (2013.01); *H01M 4/133* (2013.01); *H01G 11/42* (2013.01); *Y02E 60/13* (2013.01)

(58) Field of Classification Search
CPC ...... C01B 32/198; H01G 11/86; H01G 11/46; H01G 11/04; H01G 11/36; H01G 11/38; H01B 21/02; H01B 21/04; H01B 1/02; H01B 1/04; B82Y 30/00
USPC ......... 252/500, 502, 510; 977/755, 773, 811
See application file for complete search history.

(56) References Cited

U.S. PATENT DOCUMENTS

2011/0206992 A1*   8/2011   Campbell ............... H01M 4/80
                                                         429/235
2015/0298976 A1   10/2015   Lee et al.
(Continued)

FOREIGN PATENT DOCUMENTS

CN   104658764 A  *  5/2015   ............. H01G 11/24

OTHER PUBLICATIONS

Lingappan "Molybdenum Disulfide Nanosheets Interconnected Nitrogen-Doped Reduced Graphene Oxide Hydrogel: A High-performance Heterostructure for Lithium-Ion Batteries." Electrochimica Acta 193 (2016) 128-136 (Year: 2016).*

(Continued)

*Primary Examiner* — Tri V Nguyen
(74) *Attorney, Agent, or Firm* — Bell & Manning, LLC; Michelle Manning

(57) ABSTRACT

Electrically conductive aerogel films, electrodes composed of the electrically conductive aerogel films, and supercapacitors incorporating the electrodes are provided. The aerogel films include reduced graphene oxide particles in combination with metal oxynitride fibers. By including cellulosic nanofibrils in the aerogels, the films can be made mechanically flexible and free-standing.

14 Claims, 28 Drawing Sheets

(51) Int. Cl.
H01M 4/133 (2010.01)
H01G 11/56 (2013.01)
H01M 4/131 (2010.01)
H01G 11/38 (2013.01)
H01G 11/62 (2013.01)
H01G 11/86 (2013.01)
H01G 11/42 (2013.01)

(56) References Cited

U.S. PATENT DOCUMENTS

2015/0376064 A1* 12/2015 Chung ............... C04B 33/326
 501/100
2018/0229219 A1* 8/2018 Islam ................. B01J 23/42

OTHER PUBLICATIONS

Ghosh "High Energy Density All Solid State Asymmetric Pseudocapacitors Based on Free Standing Reduced Graphene Oxide-Co3O4 Composite Aerogel Electrodes." ACS Appl. Mater. Interfaces 2016, 8, 22253-22260 (Year: 2016).*

Sun "Recent progresses in high-energy-density all pseudocapacitive-electrode-materials-based asymmetric supercapacitors." J. Mater. Chem. A, 2017, 5, 9443 (Year: 2017).*

Yu "Holey Tungsten Oxynitride Nanowires: Novel Anodes Efficiently Integrate Microbial Chemical Energy Conversion and Electrochemical Energy Storage." Adv. Mater. 2015, 27, 3085-3091 with supplemental document. (Year: 2015).*

Brezesinski, Torsten, et al., Ordered mesoporous-MoO3 with iso-oriented nanocrystalline walls for thin-film pseudocapacitors, Nature Materials 9, Feb. 2010, pp. 146-151.

Chang, Jian, et al., Asymmetric Supercapacitors Based on Graphene/MnO2 Nanospheres and Graphene/MoO3 Nanosheets with High Energy Density, Advanced Functional Materials 23, Aug. 30, 2013, pp. 5074-5083.

Galinski, Maciej, et al., Ionic liquids as electrolytes, Electrochimica Acta 51, Apr. 19, 2006, pp. 5567-5580.

Gao, Kezheng, et al., Cellulose nanofiber-graphene all solid-state flexible supercapacitors, Journal of Materials Chemistry A 1, Oct. 15, 2012, pp. 63-37.

Gao, Wei, et al., New insights into the structure and reduction of graphite oxide, Nature Chemistry 1, Aug. 2009, pp. 403-408.

Giardi, Rossella, et al., One-pot synthesis of graphene-molybdenum oxide hybrids and their application to supercapacitor electrodes, Applied Materials Today 1, Aug. 10, 2015, pp. 27-32.

Javadi, Alireza, et al., Polyvinyl Alcohol-Cellulose Nanofibrils-Graphene Oxide Hybrid Organic Aerogels, Applied Materials & Interfaces 5, Jun. 24, 2013, pp. 5969-5975.

Ke, Qingqing, et al., Graphene-based materials for supercapacitor electrodes—A review, J. Materiomics 2, Jan. 22, 2016, pp. 37-54.

Kuila, Tapas, et al., Recent advances in the efficient reduction of graphene oxide and its application as energy storage electrode materials, Nanoscale 5, Oct. 13, 2012, pp. 52-71.

Lewandowski, Andrzej, et al., Ionic liquids as electrolytes for Li-ion batteries—An overview of electrochemical studies, Journal of Power Sources 194, Jul. 7, 2009, pp. 601-609.

Li, Li, et al., Reduced graphene oxide-linked stacked polymer forests for high energy-density supercapacitor, Nano Energy 2, Aug. 11, 2013, pp. 628-635.

Li, Yifei, et al., Flexible electrode for long-life rechargeable sodium-ion batteries: effect of oxygen vacancy in MoO3-x, J. Mater. Chem. A 4, Mar. 11, 2016, pp. 5402-5405.

Ma, Guoqiang, et al., Multilayered paper-like electrodes composed of alternating stacked mesoporous Mo2N nanobelts and reduced graphene oxide for flexible all-solid state supercapacitors, J. Mater. Chem. 3, May 31, 2015, pp. 14617-14624.

Van Aken, Katherine, et al., Formulation of Ionic-Liquid Electrolyte to Expand the Voltage Window of Supercapacitors, Angew. Chem. Int. Ed. 54, Mar. 18, 2015, pp. 4806-4809.

Wang, Guoping, et al., A review of electrode materials for electrochemical supercapacitors, Chem. Soc. Rev. 41, Mar. 4, 2011, pp. 797-828.

Wang, Xiao-Jun, et al., Ammonolyzed MoO 3 Nanobelts as Novel Cathode Material of Rechargeable Li-Ion Batteries, Advanced Energy Materials 3, Nov. 21, 2012, pp. 606-614.

Xiao, Xu, et al., FreestandingMoO3-x nanobelt/carbon nanotube films for Li-ion intercalation pseudocapacitors, Nano Energy 9, Aug. 11, 2014, pp. 355-363.

Yao, Bin, et al., Flexible Transparent Molybdenum Trioxide Nanopaper for Energy Storage, Adv. Mater. 28, May 13, 2016, pp. 6353-6358.

Zheng, Qifeng, et al., A freestanding cellulose nanofibril-reduced graphene oxide-molybdenum oxynitride aerogel film electrode for all-solid-state supercapacitors with ultrahigh energy density, Journal of Materials Chemistry A 5:24, Jun. 2, 2017, pp. 12528-12541.

Zheng, Qifeng, et al., Cellulose Nanofibril/Reduced Graphene Oxide/Carbon Nanotube Hybrid Aerogels for Highly Flexible and All-Solid-State Supercapacitors, Applied Materials & Interfaces 7, Jan. 27, 2015, pp. 3263-3271.

Zheng, Qifeng, et al., Green synthesis of polyvinyl alcohol (PVA)-cellulose nanofibril (CNF) hybrid aerogels and their use as superabsorbents, J. Mater. Chem. A 2, Dec. 16, 2013, pp. 3110-3118.

Zhou, Ding, et al., Graphene-molybdenum oxynitride porous material with improved cyclic stability and rate capability for rechargeable lithium ion batteries, Phys. Chem. Chem. Phys. 15, Aug. 8, 2013, pp. 16898-16906.

Zhou, Kai, et al., UltrathinMoO3 nanocrystals self-assembled on graphene nanosheets via oxygen bonding as supercapacitor electrodes of high capacitance and long cycle life, Nano Energy 12, Jan. 16, 2015, pp. 510-520.

* cited by examiner

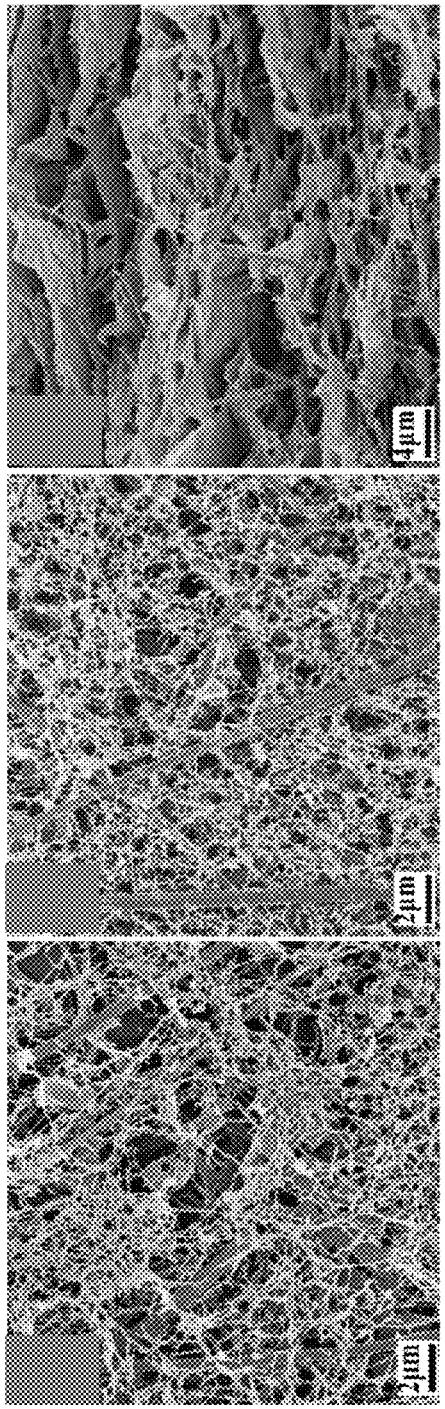
FIG. 3A
FIG. 3C
FIG. 3E
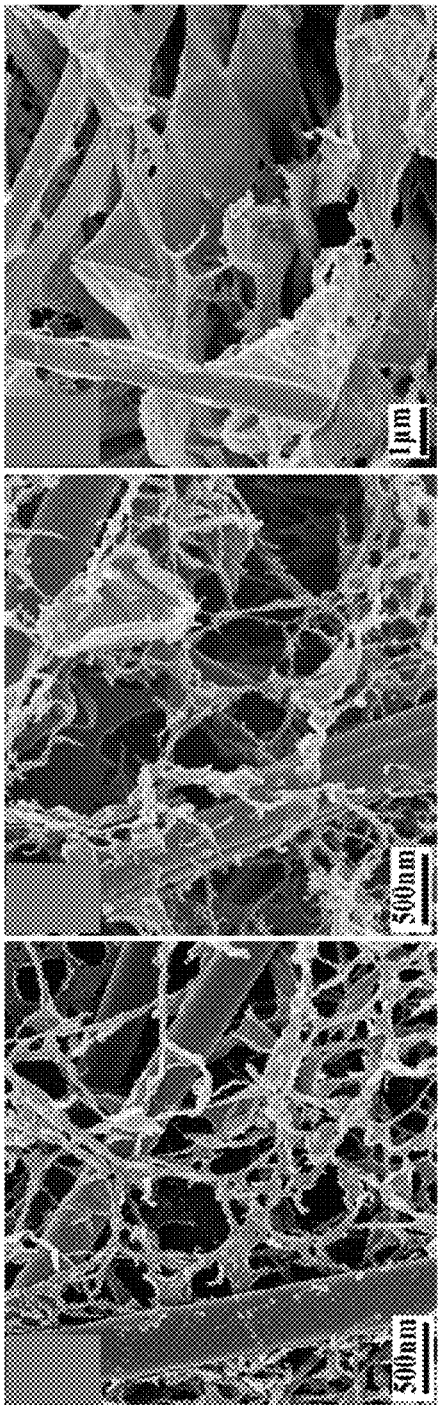
FIG. 3B
FIG. 3D
FIG. 3F

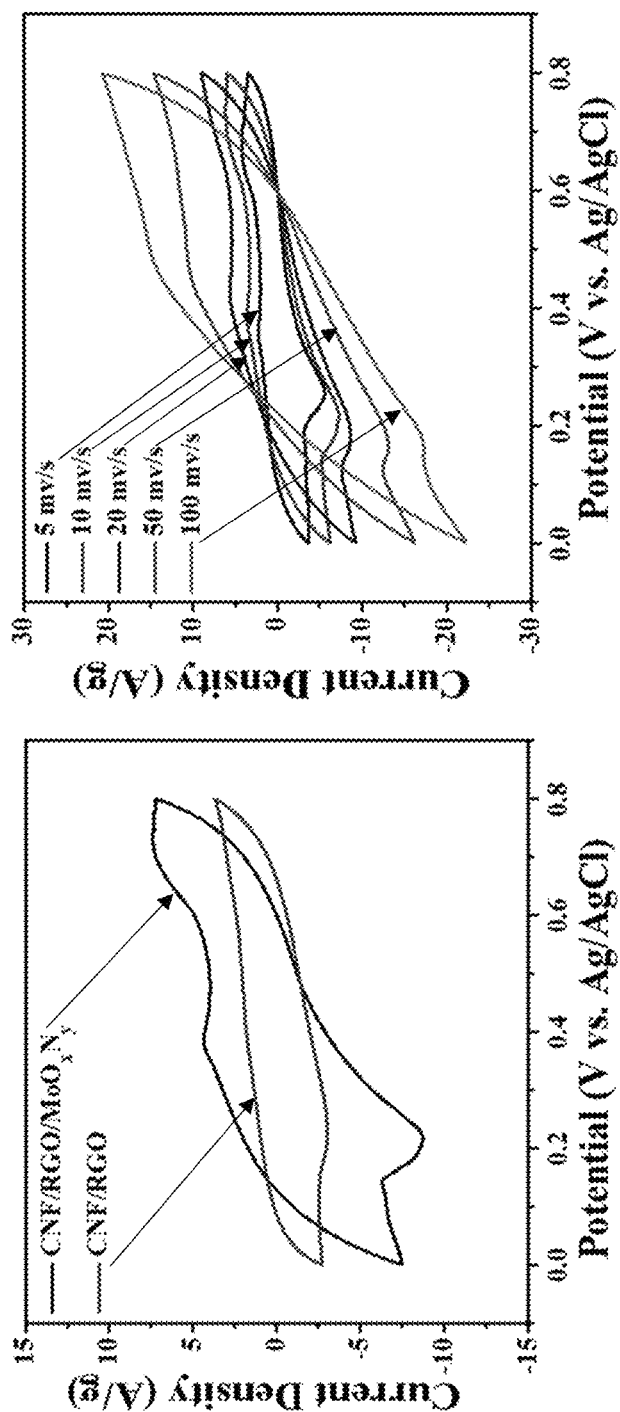
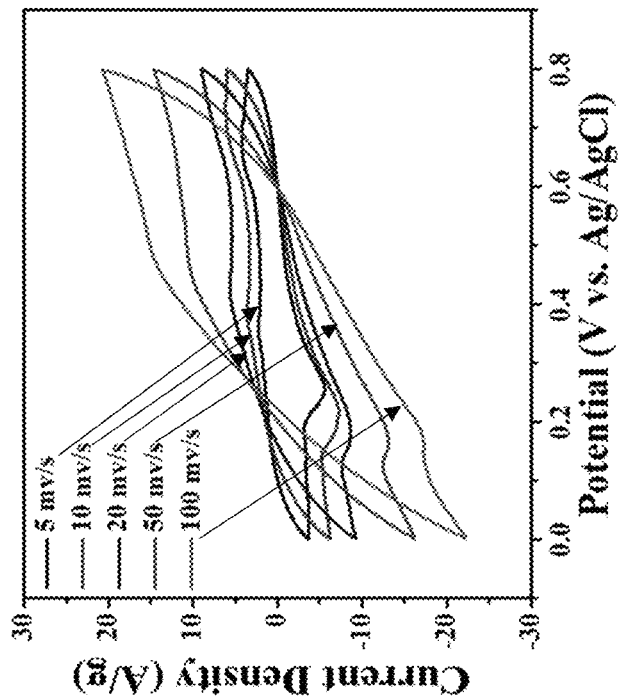
FIG. 4A
FIG. 4B

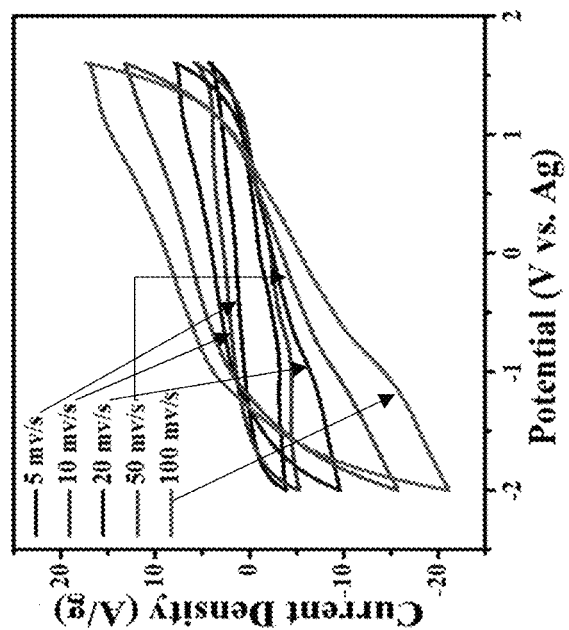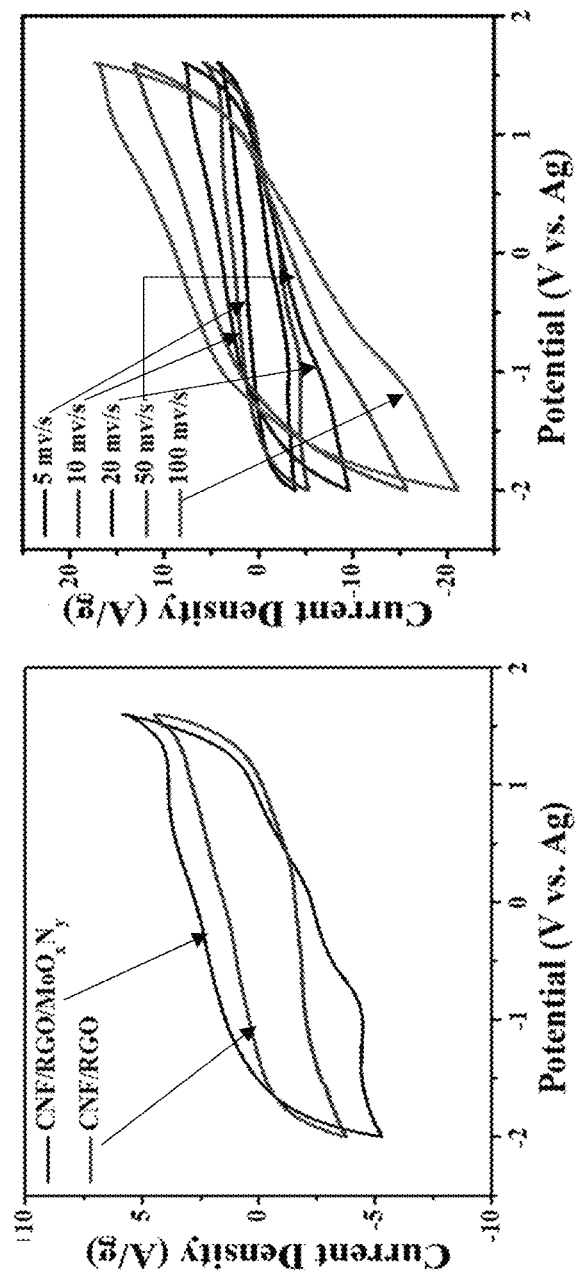
FIG. 5B
FIG. 5A

REDUCED GRAPHENE OXIDE-METAL OXYNITRIDE AEROGEL ELECTRODES

CROSS-REFERENCE TO RELATED APPLICATIONS

The present application claims priority to U.S. provisional patent application No. 62/482,348 that was filed on Apr. 6, 2017, the entire contents of which are hereby incorporated by reference.

BACKGROUND

Due to the rapidly growing market in portable electronics and hybrid vehicles, energy conversion and storage devices with high energy and power densities are in ever-increasing demand. Supercapacitors, also known as electrochemical capacitors, have attracted a great deal of attention due to their higher power densities, longer life cycles, and fast charge-discharge capabilities when compared to conventional energy storage devices such as Li-ion batteries. Unlike batteries, which are generally limited by slow reactions, supercapacitors store charges via highly reversible electric double-layer ion adsorption and/or fast faradic redox reactions, making them ideal energy storage candidates for portable electronics and hybrid vehicles where rapid energy capture and delivery are needed. Nevertheless, supercapacitors often suffer from lower energy densities when compared with Li-ion batteries.

Carbon nanomaterials (e.g., graphene and carbon nanotubes) have been explored as electrode materials for high-performance supercapacitors owing to their high specific surface area, high electrical conductivity, excellent chemical stability, and good environmental compatibility. In addition, introducing pseudocapacitive materials that are capable of fast and reversible redox reactions at the electrode surface, such as metal oxides and conductive polymers, into the electrodes has resulted in much higher capacitances compared to carbon-based materials alone.

SUMMARY

Electrically conductive aerogel films, electrodes composed of the electrically conductive aerogel films, and supercapacitors incorporating the electrodes are provided. Also provided are methods of making the aerogel films.

One embodiment of an electrically conductive film includes an aerogel comprising reduced graphene oxide particles and metal oxynitride fibers, such as molybdenum oxynitride nanobelts. The film may further include cellulose nanofibrils, which can be used to render the aerogel film free-standing.

One embodiment of a supercapacitor includes: a first electrode; a second electrode, wherein at least one of the first electrode and second electrode comprises an aerogel film as described herein; and an electrolyte disposed between and in contact with the first electrode and the second electrode.

One embodiment of a method of making an electrically conductive aerogel film includes the steps of: forming a dispersion comprising graphene oxide particles, metal oxide fibers, and, optionally, cellulose nanofibrils; freeze drying the dispersion, wherein an aerogel comprising the graphene oxide particles, metal oxide fibers, and cellulose nanofibrils is formed; optionally, compressing the aerogel; and exposing the aerogel to a nitrogen-containing reducing agent, wherein the graphene oxide particles are converted into reduced graphene oxide particles and the metal oxide fibers are is reduced to metal oxynitride fibers. The metal oxide fibers can be, for example, molybdenum trioxide fibers and the metal oxynitride fibers can be, for example, molybdenum oxynitride fibers.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3A. SEM image of the bottom surface of a CNF/GO/MoO$_3$ aerogel film. FIG. 3B. Enlarged view of a portion of the SEM image of the bottom surface of the CNF/GO/MoO$_3$ aerogel film. FIG. 3C. SEM image of the bottom surface of a CNF/RGO/MoO$_x$N$_y$ aerogel film. FIG. 3D. Enlarged view of a portion of the SEM image of the bottom surface of the CNF/RGO/MoO$_x$N$_y$ aerogel film. FIG. 3E. SEM image of a cross-section of a CNF/RGO/MoO$_x$N$_y$ aerogel film. FIG. 3F. Enlarged view of a portion of the SEM image of a cross-section of the CNF/RGO/MoO$_x$N$_y$ aerogel film.

FIGS. 4A-4F show the electrochemical characterization of CNF/RGO and CNF/RGO/MoO$_x$N$_y$ aerogel film electrodes in 1.0 M H$_2$SO$_4$ aqueous electrolyte in a three-electrode system. FIG. 4A shows typical CV curves of the CNF/RGO and CNF/RGO/MoO$_x$N$_y$ aerogel film electrodes at a scan rate of 10 mV/s. FIG. 4B shows CV curves of the CNF/RGO/MoO$_x$N$_y$ aerogel film electrode at different scan rates. FIG. 4C shows galvanostatic charge-discharge curves of the CNF/RGO and CNF/RGO/MoO$_x$N$_y$ aerogel film electrodes at a current density of 2.0 A/g. FIG. 4D shows galvanostatic charge-discharge curves of the CNF/RGO/MoO$_x$N$_y$ aerogel film electrodes at different current densities. FIG. 4E shows the specific capacitance of the CNF/RGO and CNF/RGO/MoO$_x$N$_y$ aerogel film electrodes as a function of current density. FIG. 4F shows Nyquist impedance plots of the CNF/RGO and CNF/RGO/MoO$_x$N$_y$ aerogel film electrodes with an inset showing the magnified high-frequency region.

FIGS. 5A-5F show the electrochemical characterization of CNF/RGO and CNF/RGO/MoO$_x$N$_y$ aerogel film electrodes in 50 vol. % [BMPY][NTf$_2$] acetonitrile solution in a three-electrode system. FIG. 5A shows typical CV curves of the CNF/RGO and CNF/RGO/MoO$_x$N$_y$ aerogel film electrodes at a scan rate of 10 mV/s. FIG. 5B shows CV curves of the CNF/RGO/MoO$_x$N$_y$ aerogel film electrode at different scan rates. FIG. 5C depicts galvanostatic charge-discharge curves of the CNF/RGO and CNF/RGO/MoO$_x$N$_y$ aerogel film electrodes at a current density of 2.0 A/g. FIG. 5D shows galvanostatic charge-discharge curves of the CNF/RGO/MoO$_x$N$_y$ aerogel film electrodes at different current densities. FIG. 5E shows the specific capacitance of the CNF/RGO and CNF/RGO/MoO$_x$N$_y$ aerogel film electrodes as a function of current density. FIG. 5F depicts Nyquist impedance plots of the CNF/RGO and CNF/RGO/MoO$_x$N$_y$ aerogel film electrodes.

FIG. 6B shows typical CV curves of CNF/RGO- and CNF/RGO/MoO$_x$N$_y$-based solid-state supercapacitors at a scan rate of 10 mV/s. FIG. 6C shows CV curves of the CNF/RGO/MoO$_x$N$_y$-based solid-state supercapacitors at different scan rates. FIG. 6D depicts galvanostatic charge-discharge curves of the CNF/RGO- and CNF/RGO/MoO$_x$N$_y$-based solid-state supercapacitors at a current density of 1.0 A/g. FIG. 6E shows galvanostatic charge-discharge curves of the CNF/RGO/MoO$_x$N$_y$-based solid-state supercapacitors at different current densities. FIG. 6F shows the specific capacitance of the CNF/RGO and CNF/RGO/MoO$_x$N$_y$ aerogel film electrodes as a function of current density. FIG. 6G depicts Nyquist impedance plots of the CNF/RGO- and CNF/RGO/MoO$_x$N$_y$-based solid-state supercapacitors. FIG. 6H shows the cycling stability of a solid-state device over 2000 cycles at a current density of 1 A/g. The inset shows the galvanostatic charge-discharge curves for the 1st, 500th, 1000th, 1500th, and 2000th cycles.

FIG. 7A shows typical CV curves of CNF/RGO- and CNF/RGO/MoO$_x$N$_y$-based solid-state supercapacitors at a scan rate of 10 mV/s. FIG. 7B shows CV curves of the CNF/RGO/MoO$_x$N$_y$-based solid-state supercapacitors at different scan rates. FIG. 7C depicts galvanostatic charge-discharge curves of the CNF/RGO- and CNF/RGO/MoO$_x$N$_y$-based solid-state supercapacitors at a current density of 1.0 A/g. FIG. 7D shows galvanostatic charge-discharge curves of the CNF/RGO/MoO$_x$N$_y$-based solid-state supercapacitors at different current densities. FIG. 7E depicts the specific capacitance of the CNF/RGO and CNF/RGO/MoO$_x$N$_y$ aerogel film electrodes as a function of current density. FIG. 7F shows Nyquist impedance plots of the CNF/RGO- and CNF/RGO/MoO$_x$N$_y$-based solid-state supercapacitors.

FIG. 8A shows cycling stability of a solid-state supercapacitor over 2000 cycles at a current density of 1 A/g. The inset shows the galvanostatic charge-discharge curves for the 1st, 500th, 1000th, 1500th, and 2000th cycles. FIG. 8B shows cyclic voltammetry curves of a supercapacitor at different bending angles with a scan rate of 10 mV/s. FIG. 8C depicts dependence of specific capacitance for a supercapacitor at different bending angles. The inset shows the charge-discharge curves of a supercapacitor at different bending angles with a current density of 1 A/g. FIG. 8D shows that a solid-state supercapacitor can be easily charged by a porous CNF/PDMS aerogel film-based nanogenerator (NG) under a compressive stress of 0.04 MPa at a frequency of 20 Hz. FIG. 8E depicts self-discharge curves of a solid-state supercapacitor after being charged at 3.0 V for 10 min.

In FIG. 9A, traces A and B represent data from the Example. Trace C is data taken from Y. J. Kang, et al., *ACS Nano*. 2012, 6, 6400; trace D is data taken from J. Zhi, et al., *Nanoscale*. 2016, 8, 11976; trace F is data taken from Z.-S. Wu, et al., *Adv Mater.* 2012, 24, 5130; trace G is data taken from Y. Liu, et al., *Sci Rep-Uk*. 2015, 5, 17045; trace H is data taken from G. Wang, et al., *Adv Mater.* 2014, 26, 2676; and trace I is data taken from Yan et al., *Adv Energy Mater.* 2014, 4, 1300816.

In FIG. 9B, traces A and B represent data from the Example. Trace C is data taken from J. Zhi, et al., *Nanoscale*. 2016, 8, 11976; traces D and F are data taken from M. F. El-Kady, R. B. Kaner, *Nat Commun*. 2013, 4, 1475; traces H and I are data taken from M. F. El-Kady, V. Strong, S. Dubin, R. B. Kaner, *Science*. 2012, 335, 1326; trace E is data taken from Hao, et al., *Adv Mater.* 2016, 28, 3194; and trace G is data taken from Z.-S. Wu, et al., *Adv Mater.* 2012, 24, 5130.

DETAILED DESCRIPTION

Figure 1:
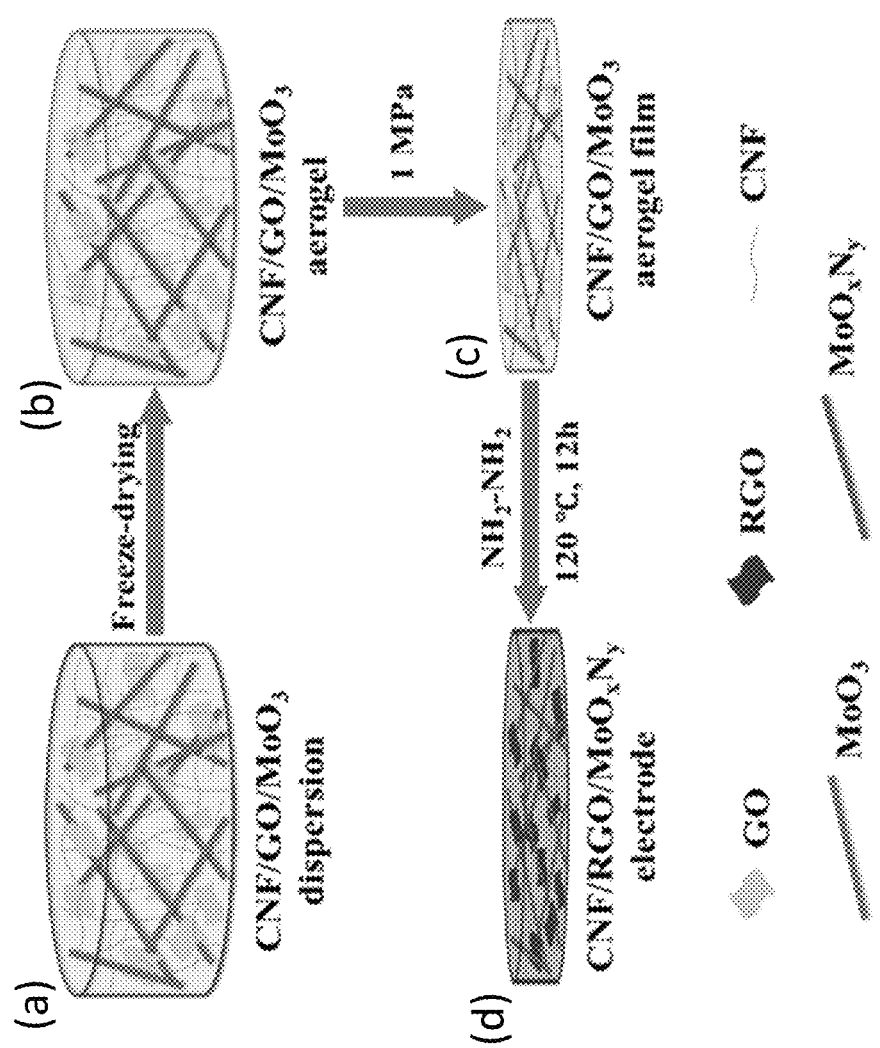
FIG. 1: Scheme 1. The fabrication process for a porous CNF/RGO/MoO$_x$N$_y$ aerogel film electrode.

Electrically conductive aerogel films, electrodes composed of the electrically conductive aerogel films, and supercapacitors incorporating the electrodes are provided.

The aerogel films, which include reduced graphene oxide particles in combination with metal oxynitride fibers, are lightweight and highly porous. By including cellulosic nanofibrils in the aerogels, the films can be made mechanically flexible and free-standing. Supercapacitors incorporating the aerogel films as electrodes are able to deliver a high specific capacitance and energy density with long-term cycling stability.

The reduced graphene oxide (RGO) particles provide an electrically conductive, high-surface area electrode material.

The reduced graphene oxide particles may be, for example, micro- and/or nano-scale graphene sheets ("nanosheet"), having diameters of up to, for example, 30 μm and, more typically up to 10 μm. For example, graphene oxide particles having diameters in the range from 250 nm to 30 μm can be used.

The metal oxynitride fibers, which can be formed via the partial reduction and nitrogen doping of metal oxide fibers, provide a pseudocapacitive electrode material. The degree of metal oxide reduction and nitrogen doping will depend, at least in part, on the reduction conditions and duration. In some embodiments of the electrode materials, the metal oxynitride fibers are molybdenum oxynitride ($MoO_xN_y$) fibers. In some of these embodiments $1<x<3$ and $0<y<1$. This includes embodiments in which $1.8<x<2.7$ and $0.1<y<0.5$. Other metal oxides that can be used in the electrode materials include manganese oxynitride fibers, indium oxynitride fibers, tungsten oxynitride fibers, combinations of two or more of these fibers, and combinations of one or more of these fibers with molybdenum oxynitride fibers. The manganese oxynitride fibers, indium oxynitride fibers, and tungsten oxynitride fibers can be formed via the partial reduction and nitrogen doping of manganese oxide ($MnO_2$) fibers, and indium oxide ($In_2O_3$) fibers, and tungsten oxide ($WO_3$) fibers, respectively. The electrode materials can be free of any additional electroactive additives, although such electroactive additives can be included.

The metal oxynitride fibers are high aspect ratio crystalline particles that can contribute to the free-standing nature of the aerogel films. The metal oxynitride fibers have an aspect ratio of at least 10. In some embodiments of the aerogel films, the metal oxynitride fibers have an aspect ratio of at least 50, at least 100, or at least 200. By way of illustration, the metal oxynitride fibers can have widths in the range from 20 nm to 1000 nm, including widths in the range from 50 nm to 500 nm, and lengths in the range from 50 μm to 500 μm, including lengths in the range from 100 μm to 300 μm. However, metal oxynitride fibers having width and length dimensions outside of these ranges can be used. Because a sample of fibers will generally have some size polydispersity, the dimensions recited above (and the dimensions for other particles recited herein) refer to the average dimensions for the collection of fibers (or other particles) in a given sample. Examples of metal oxynitride fibers include metal oxynitride nanotubes, nanorods, and nanobelts, that latter of which are characterized by a rectangular cross-section along their length. The metal oxynitride fibers can be formed by the partial reduction of metal oxide fibers, which results in the nitrogen-doping of the oxide. This nitrogen doping increases the electrical conductivity of the metal oxynitride, relative to the metal oxide, and therefore, improves the performance of an electrode made from the reduced material. In addition to, or as an alternative to, the metal oxynitride fibers, other metal oxynitride particles (i.e., particles having smaller aspect ratios) can be used. However, the use of fibers is desirable for the fabrication of a free-standing film.

Some embodiments of the aerogel films include cellulose nanofibrils (CNFs) to render the films flexible, strong, and free-standing, without the need to include a binder, such as a polymer binder, in the film. Although, binders can be included. CNFs exhibit high aspect ratios, high surface areas, good mechanical properties, and excellent flexibility. As used herein, the term free-standing refers to a film that does not require a support substrate to provide it with structural integrity. As such, the free-standing films can be handled independent of any support substrate. In addition, the CNFs can prevent or reduce the aggregation of the reduced graphene oxide sheets in the films, which can reduce the specific capacitance of the aerogel. The CNFs are long, flexible, fiber-like cellulose nanoparticles that can be branched or unbranched. The CNFs can be derived from cellulose via, for example, processing macroscopic cellulose fibers under high shear, TEMPO-mediated oxidation, or enzymatic hydrolysis. CNFs are primarily composed of cellulose, but may also include hemicellulose and/or lignin. The CNFs have an aspect ratio of at least 100. In some embodiments of the aerogel films, the CNFs have an aspect ratio of at least 500 or at least 1000. By way of illustration, the CNFs can have lengths in the range from 500 nm to 10 μm, including lengths in the range from 1 μm to 5 μm; and widths in the range from 2 nm to 100 nm, including widths in the range from 5 nm to 20 nm. However, CNFs having width and length dimensions outside of these ranges can be used. CNFs are sometimes referred to as nanocellulose fibrils (NFC) or cellulose nanofibers.

The aerogels are highly porous, solid materials that can be made by replacing a liquid solvent in a gel with air, as illustrated in the example. The relative amounts of the components that constitute the aerogel can vary over a relatively wide range. The aerogels should include enough of the active materials (i.e., the reduced graphene oxide particles and metal oxynitride fibers) to provide an electrode having good performance, and should include enough CNFs to provide the desired degree of mechanical flexibility and cyclic stability. By way of illustration, some embodiments of the aerogel films include from 20 wt. % to 60 wt. % of the CNFs and from 40 wt. % to 80 wt. % of a mixture of the RGO particles and the $MoO_xN_y$ fibers. This includes embodiments of the aerogel films that include from 30 wt. % to 50 wt. % of the CNFs and from 50 wt. % to 70 wt. % of a mixture of the RGO particles and the $MoO_xN_y$ fibers. The weight ratio of the RGO particles to the $MoO_xN_y$ fibers in the aerogel films can range from, for example, 1:3 to 3:1, including ratios in the range from 2:1 to 1:2. By way of illustration, the RGO particles and $MoO_xN_y$ fibers may each be present in the aerogel films at concentrations in the range from about 20 wt. % to 40 wt. %.

Methods of making the aerogel films are described in detail in the Example. One embodiment of a method of making an aerogel film is illustrated schematically in FIG. 1. As shown in panel (a), the process begins with a homogeneous dispersion, such as an aqueous dispersion, of CNFs 102, graphene oxide (GO) particles 104, and $MoO_3$ fibers 106. This dispersion is converted into an aerogel having a highly interconnected and porous cellular structure by freeze-drying to remove the liquid (panel (b)). This aerogel is then compressed into a film (panel (c)). By way of illustration, the compressed aerogel film can have a thickness of, for example 500 μm or less, 300 μm or less, or 200 μm or less. The GO particles and $MoO_3$ fibers are then reduced by a nitrogen-containing reducing agent to form RGO particles 108 and $MoO_xN_y$ fibers 110, respectively (panel (d)). The reduction should be carried out at a temperature below which the CNFs in the aerogel degrade. Thus, the reduction is desirably carried out at a temperature of less than 160° C. and more desirably less than 140° C. For example, the reduction can be conducted at temperatures in the range from 100° C. to 150° C. The reduction should be carried out for a time sufficient to achieve the desired degree of reduction and nitrogen doping of the metal oxide fibers. In some embodiments of the methods, the duration of the reduction is 24 hours or less, including 12 hours or less. Hydrazine is one example of a suitable nitrogen containing reducing agent. By way of illustration, embodiments of the reduced aerogels can have average pore sizes in the range from 5 μm to 10 μm and/or porosities of 95% or greater, including 98% or greater.

Figure 6A:
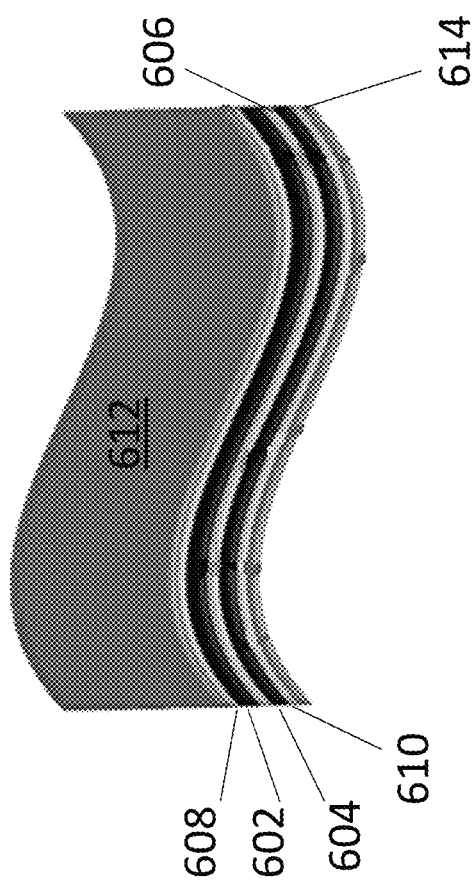
FIG. 6A is a schematic diagram of an all-solid-state supercapacitor, where a polymer gel electrolyte serves as the electrolyte as well as the separator.

The aerogel films can be used as electrodes in electronic devices, including supercapacitors. By incorporating the flexible, free-standing electrodes with other flexible components, light weight, highly mechanically flexible supercapacitors can be fabricated. A schematic diagram of one embodiment of a flexible supercapacitor is shown in FIG. 6A. The supercapacitor includes a first electrode 602 and a second electrode 604, one or both of which are comprised of an aerogel of CNFs, RGO particles, and $MoO_xN_y$ fibers (referred to as a $CNF/RGO/MoO_xN_y$ aerogel). First and second electrodes 602 and 604 are in electrical communication through an electrolyte 606, which infiltrates the porous structure of the electrodes. Liquid electrolytes or solid electrolytes can be used in the supercapacitors. If a liquid electrolyte is used, a separator can be disposed between the first and second electrodes. The separator is typically a thin membrane having a high ion permeability. If a solid electrolyte is employed, the electrolyte can act as a separator and no additional separator is needed. As illustrated in the figure, the supercapacitor may further include a first current collector 608 in electrical communication with first electrode 602 and a second current collector 610 in electrical communication with second electrode 604. The current collectors may be thin metal films, such as aluminum foils. In the embodiment shown here, the active layers of the supercapacitor are sandwiched between a pair of flexible substrates 612, 614, such as thin polymer sheets.

Suitable liquid electrolytes include aqueous electrolytes and ionic liquids. Suitable aqueous electrolytes include aqueous sulfuric acid solutions, aqueous solutions of phosphoric acid and potassium hydroxide, and aqueous solutions of LiCl. The ionic liquids, which are organic salts with low melting points, include imidazolium-based ionic liquids, such as 1-butyl-1-methylpyrrolidinium bis(trifluoromethylsulfonyl) imide ([BMPY][NTf$_2$]), 1-ethyl-3-methylimidazolium bis(trifluoromethylsulfonyl)imide [EMIM][NTf$_2$], and 1-butyl-3-methylimidazolium tetrafluoroborate [BMIM][BF$_4$].

In some embodiments of the supercapacitors, the electrolyte is a gel-based solid electrolyte in which a liquid phase is immobilized in a three dimensional support matrix. The three dimensional matrix can be an organic matrix or an inorganic matrix. Solid electrolytes can be incorporated in all-solid-state supercapacitors, which are advantageous for many applications, such as wearable electronics, because they can be made thin, light-weight, and flexible and they avoid the risk of liquid electrolyte leakage. The gel-based electrolytes can be, for example, ionogel electrolytes or hydrogel electrolytes. In an ionogel electrolyte, an ionic liquid is immobilized within a three-dimensional matrix, such as a polymer matrix. The ionic liquids in the ionogels can be, for example, imidazolium-based ionic liquids, as described above. The polymer matrix can be formed from, for example, fluoride (PVDF), poloxamers (non-ionic block copolymers of poly(ethylene oxide) (PEO)-poly (propylene oxide) (PPO)), block copolymers of poly(ethylene oxide) and polystyrene, and cellulosic polymers, such as methyl cellulose.

Hydrogel electrolytes can also be used as solid-state electrolytes in the supercapacitors. In a hydrogel electrolyte, an aqueous electrolyte solution is immobilized within a three-dimensional matrix, such as a polymer matrix. By way of illustration only, the hydrogel may comprise aqueous solutions of sulfuric acid, LiCl, potassium hydroxide, or phosphoric acid in a polymer matrix composed of, for example, polyvinyl alcohol (PVA).

As illustrated in the Example, supercapacitors that incorporate the aerogel electrodes are able to provide high specific capacitance and high energy densities, while maintaining high power densities and cyclic stabilities. Some embodiments of the supercapacitors provide an energy density of at least 90 Wh/kg with a power density of at least 300 W/kg. This includes embodiments of the supercapacitors provide an energy density of at least 100 Wh/kg with a power density of at least 400 W/kg. For example, embodiments of the supercapacitors can provide an energy density in the range from 100 Wh/kg to 200 Wh/kg with a power density in the range from 400 W/kg to 14000 W/kg. In terms of volumetric energy density, these embodiments of the supercapacitors can provide an energy density of at least 10 Wh/L with a power density of at least 50 W/L, including at least 70 W/L.

Some embodiments of the supercapacitors provide a specific capacitance of at least 200 F/g at a current density of 1 A/g. This includes embodiments of the supercapacitors that provide a specific capacitance of at least 250 F/g at a current density of 1 A/g, further includes embodiments of the supercapacitors that provide a specific capacitance of at least 300 F/g at a current density of 1 A/g, and still further includes embodiments of the supercapacitors that provide a specific capacitance of at least 350 F/g at a current density of 1 A/g.

EXAMPLE

Figures 10A, 10B:
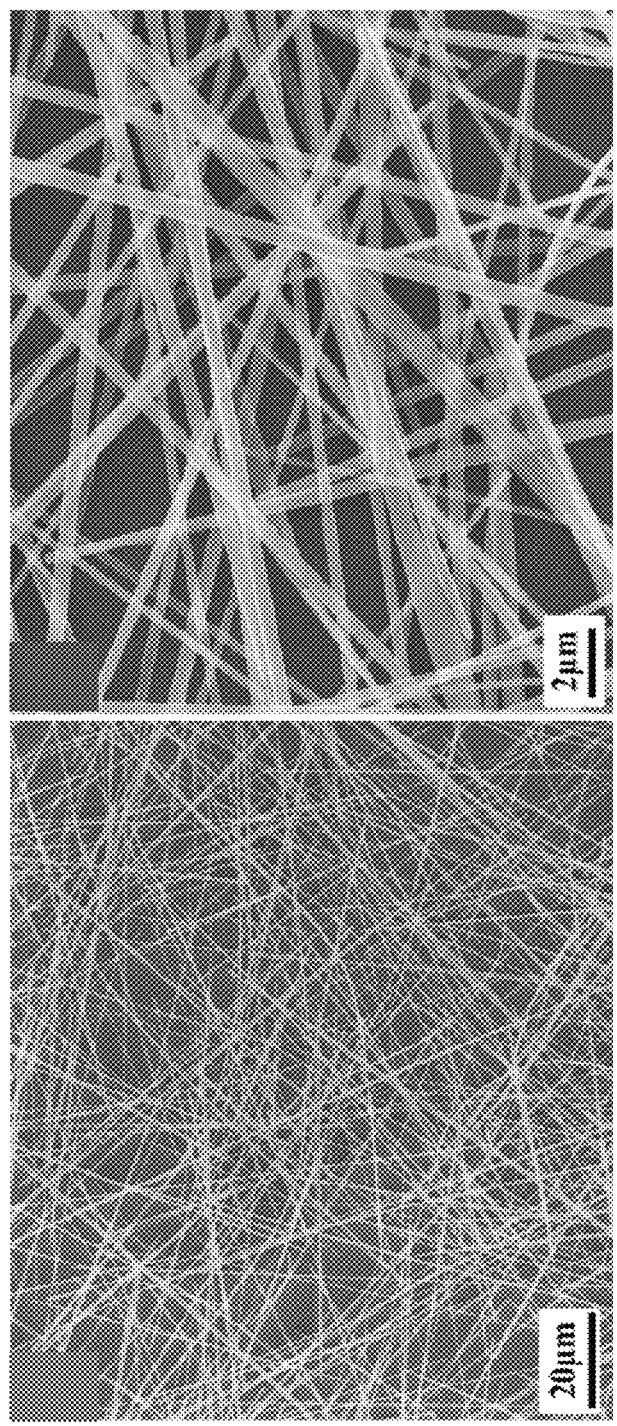
FIG. 10A is an SEM image of MoO$_3$ nanobelts.
FIG. 10B is an enlarged view of the SEM image of the nanobelts.
Figure 11A:
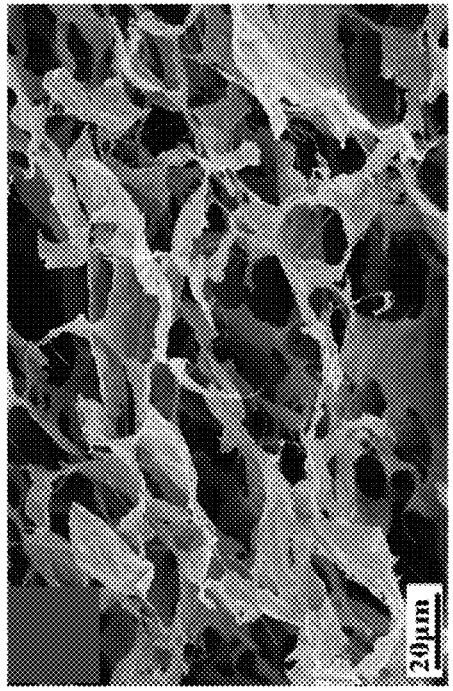
FIG. 11A is an SEM image of the cryofractured surfaces of a CNF/GO aerogel.
Figure 11B:
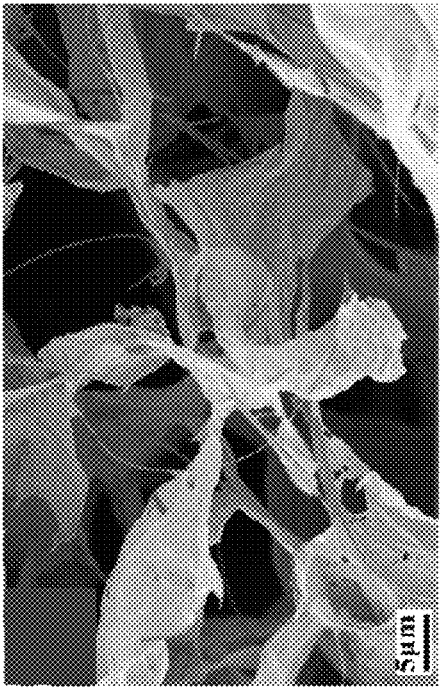
FIG. 11B is an enlarged view of a portion of the cryofractured surfaces of the CNF/GO aerogel.
Figure 11C:
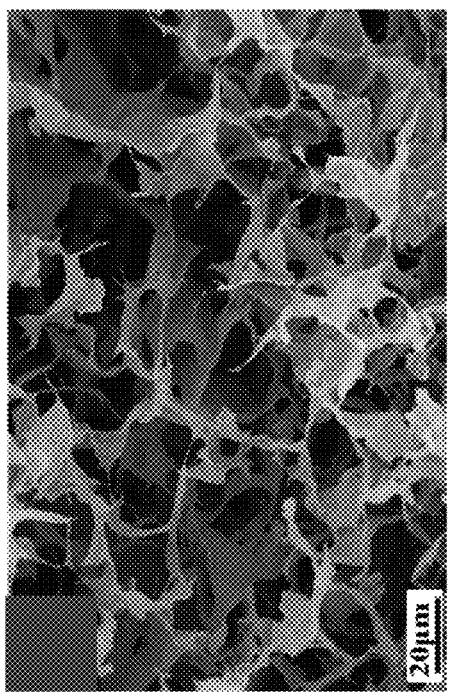
FIG. 11C is an SEM image of a cryofractured surfaces of a CNF/GO/MoO$_3$ aerogel.
Figure 11D:
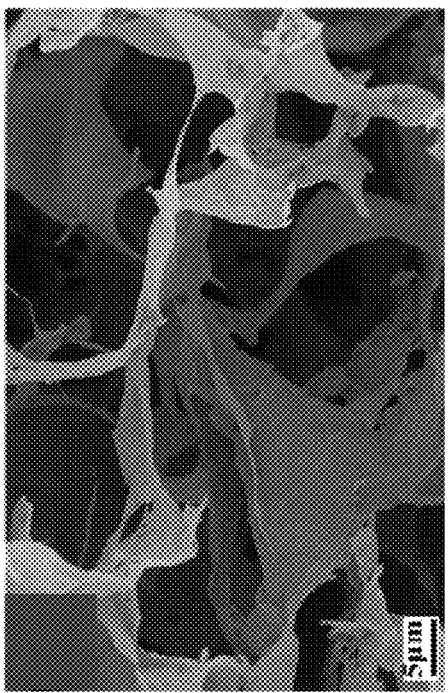
FIG. 11D is an enlarged view of a portion of the SEM image of the cryofractured surfaces of the CNF/GO/MoO$_3$ aerogel.
Figures 12A, 12B, 12C, 12D, 12E, 12F:
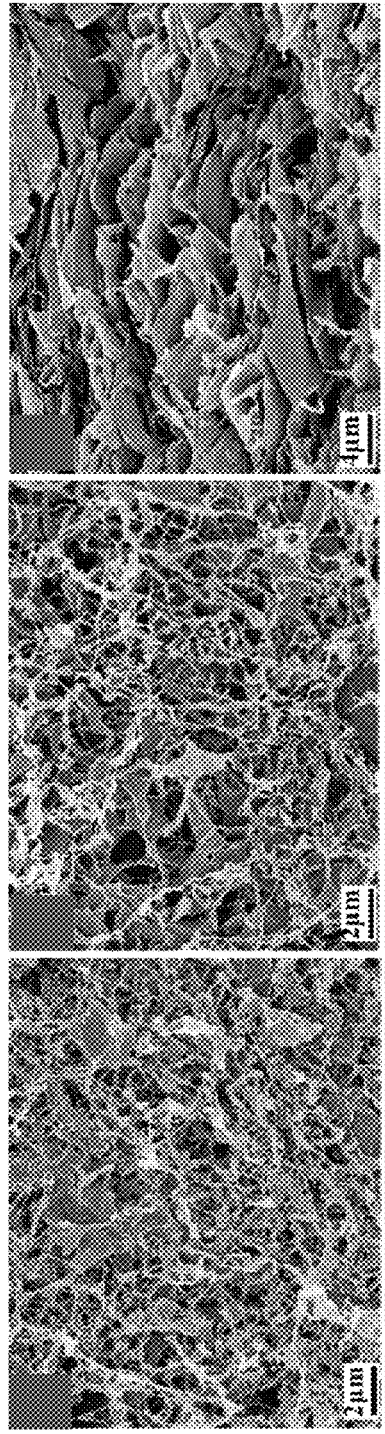
FIG. 12A is an SEM image of the bottom surface of a CNF/GO aerogel film.
FIG. 12B is an enlarged view of a portion of the SEM image of the bottom surface of the CNF/GO aerogel film.
FIG. 12C is an SEM image of the bottom surface of a CNF/RGO aerogel film.
FIG. 12D is an enlarged view of a portion of the SEM image of the bottom surface of the CNF/RGO aerogel film.
FIG. 12E is an SEM image of a cross-section of a CNF/RGO aerogel film.
FIG. 12F is an enlarged view of a portion of the SEM image of the cross-section surface of the CNF/RGO aerogel film.

This example illustrates the preparation of a cellulose nanofibril (CNF)-graphene oxide (GO)-molybdenum trioxide (MoO$_3$) hybrid (CNF/GO/MoO$_3$) aerogel with a high mass loading of MoO$_3$ (i.e., 30 wt. %) via an environmentally friendly freeze-drying process. Upon hydrazine vapor treatment of the compressed CNF/GO/MoO$_3$ aerogel film, the partial reduction and nitrogen doping of the MoO$_3$ nanobelts occurred simultaneously with the reduction of the GO to reduced graphene oxide (RGO). As a result, a free-standing, lightweight, highly porous, and highly flexible CNF-RGO-molybdenum oxynitride (MoO$_x$N$_y$) aerogel film electrode was obtained. Significantly, the resulting free-standing CNF/RGO/MoO$_x$N$_y$ aerogel film electrode delivered an outstanding specific capacitance of 680 F/g in an aqueous electrolyte and 518 F/g in an ionic liquid electrolyte in a three-electrode configuration at a current density of 1.0 A/g. Furthermore, highly flexible and all-solid-state supercapacitors using CNF/RGO/MoO$_x$N$_y$ as electrodes and poly(vinyl alcohol) (PVA)H$_2$SO$_4$ hydrogel or poly(vinylidene fluoride) (PVDF)-poloxamer 407 (P407)-1-butyl-1-methylpyrrolidinium bis(trifluoromethylsulfonyl) imide ([BMPY][NTf$_2$]) ionogel as solid-state electrolytes were fabricated. These supercapacitors exhibited high specific capacitances and high energy densities, while maintaining high power densities and excellent long-term cycling stabilities. Considering their excellent electrochemical performance, ease of large-scale manufacturing, and environmental friendliness, this example demonstrates an approach for fabricating porous flexible electrodes for assembling lightweight and low-cost energy storage devices Results and Discussion Preparation and Characterization of CNF/RGO/MoO$_x$N$_y$ Aerogel Film Electrodes Ultra-long MoO$_3$ nanobelts (NBs) were prepared using a modified hydrothermal method at 220° C. for 168 h, as reported previously. (See, B. Yao, et al., *Adv Mater.* 2016, 28, 6353.) As shown in the scanning electron microscope (SEM) images of FIGS. 10A and 10B, the $MoO_3$ NBs exhibited a very uniform morphology with lengths of ~100-200 μm, widths of ~300-500 nm, and thicknesses of ~50-80 nm. The ultra-long $MoO_3$ NBs are beneficial for forming a free-standing and flexible film. X-ray diffraction (XRD) patterns demonstrated that the as-synthesized $MoO_3$ NBs had an orthorhombic structure.

Graphene oxide (GO) was prepared from purified natural graphite powder using the improved Hummer's method reported by Marcano. (See, D. C. Marcano, et al., *ACS Nano.* 2010, 4, 4806.) Since GO has a large number of oxygen-containing groups, it can act as a surfactant to facilitate the dispersion of the $MoO_3$ NBs in aqueous solutions.

As shown in Scheme 1 in FIG. 1, the CNFs, GO particles, and $MoO_3$ fibers were first mixed together to obtain a uniform $CNF/GO/MoO_3$ dispersion via sonication. By freeze-drying the $CNF/GO/MoO_3$ aqueous dispersion, an ultra-light $CNF/GO/MoO_3$ aerogel (about 6 mg/mL) was obtained, which exhibited a highly interconnected and porous cellular structure with pore sizes ranging from 5 to 10 μm (FIG. 11). A $CNF/GO/MoO_3$ aerogel film with a uniform thickness of about 150 μm was obtained by compressing the aerogel at 1 MPa. For comparison purposes, a CNF/GO aerogel film (i.e., without $MoO_3$ NBs) was prepared using a similar procedure. The CNF/GO and $CNF/GO/MoO_3$ aerogel films were then subjected to the hydrazine vapor reduction at 120° C. for 12 h. A number of techniques including XRD, high resolution transmission electron microscopy (HR-TEM), energy-dispersive X-ray spectroscopy (EDS), Raman spectroscopy, X-ray photoelectron spectroscopy (XPS) and scanning electron microscopy (SEM) were used to study the structure and morphology change during the hydrazine reduction process.

Figure 2A:
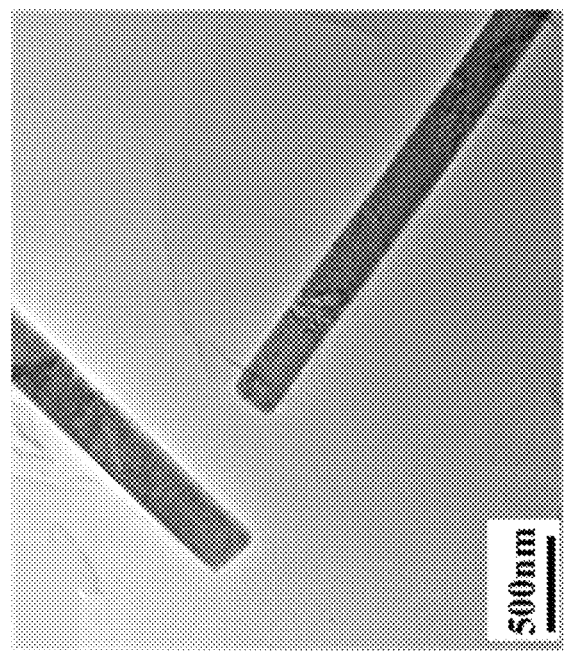
FIG. 2A. XRD patterns of CNF/GO/MoO$_3$ and CNF/RGO/MoO$_x$N$_y$ aerogel films.

The XRD pattern of the CNF/GO aerogel film exhibited a strong diffraction peak at $2\theta=10.9°$, corresponding to the (002) lattice planes of the GO nanosheets. After the CNF/GO aerogel film was treated with hydrazine vapor at 120° C. for 12 h, the diffraction peak at 10.9° vanished, indicating a complete reduction of the GO. FIG. 2A shows the XRD patterns of the $CNF/GO/MoO_3$ aerogel films before and after hydrazine vapor reduction. The intensities of the diffraction patterns of the $\alpha$-$MoO_3$ decreased significantly after a 12 h hydrazine vapor reduction, while several new diffraction peaks at $2\theta=11.0°$, 22.5°, 24.3° and 38.5° appeared. This phenomenon, which has been previously observed, indicates that $\alpha$-$MoO_3$ was mainly converted to $MoO_xN_y$ (defined as phase X, an unresolved crystalline phase, by Li et al., Effect of the Reactive Gas on the Solid-State Transformation of Molybdenum Trioxide to Carbides and Nitrides. *Chemistry of Materials* 1998, 10 (7), 1853-1862). Thus, the XRD analyses indicated that the CNF/GO and $CNF/GO/MoO_3$ aerogel films were converted to CNF/RGO and $CNF/RGO/MoO_xN_y$ aerogel films, respectively, after hydrazine vapor reduction.

Figure 2B:
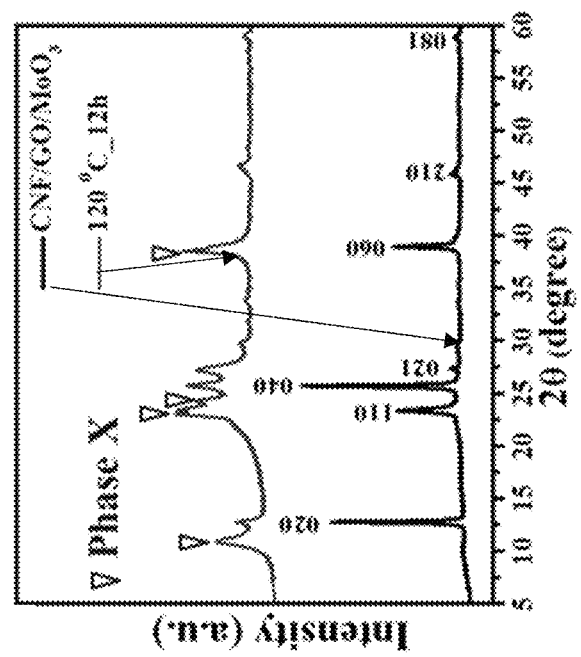
FIG. 2B. TEM image of MoO$_x$N$_y$ nanobelts (NBs) in a CNF/RGO/MoO$_x$N$_y$ aerogel film.
Figure 2D:
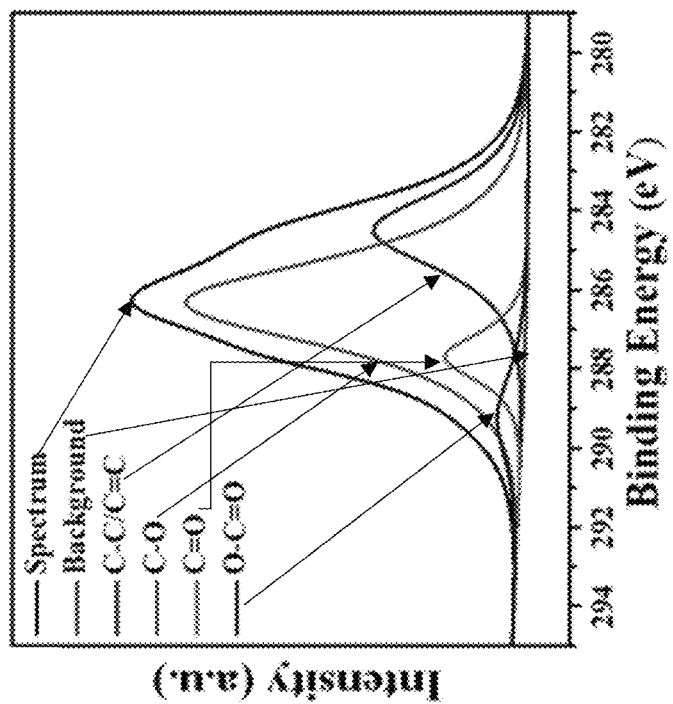
FIG. 2D. High-resolution C1s XPS spectra of a pristine CNF/GO/MoO$_3$ aerogel film.
Figure 2C:
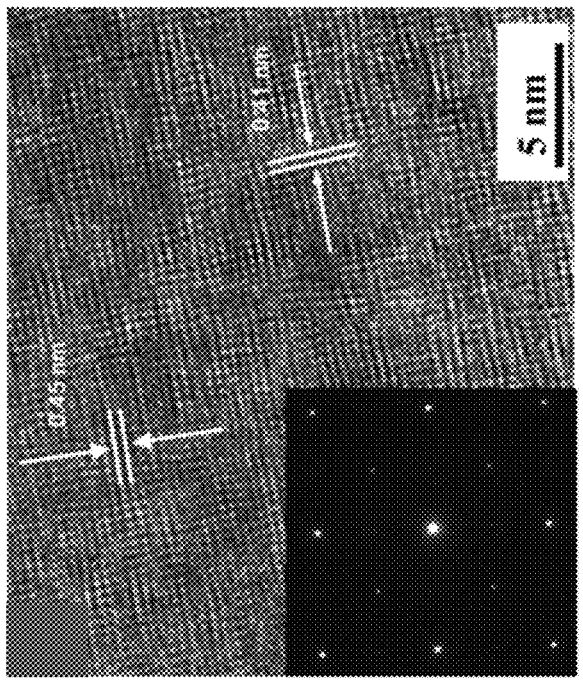
FIG. 2C. HR-TEM image of MoO$_x$N$_y$ NBs in a CNF/RGO/MoO$_x$N$_y$ aerogel film. The inset in FIG. 2C is a selected area electron diffraction (SAED) pattern.

FIGS. 2B and 2C show the TEM images of the $MoO_xN_y$ NBs in the $CNF/RGO/MoO_xN_y$ aerogel film. As shown in FIG. 2C, the high resolution TEM (HR-TEM) image and selected area electron diffraction (SAED) pattern suggest that the $MoO_xN_y$ NBs (i.e., $MoO_3$ NBs after hydrazine reduction) still exhibited an orthorhombic crystalline structure with an interplanar spacing of 0.41 and 0.45 nm, respectively, along the two perpendicular directions. However, these values were slightly different from the d-space of the orthorhombic $MoO_3$ NBs (i.e., 0.37 and 0.40 nm), indicating that the orthorhombic $MoO_3$ NBs may be converted to a new crystalline structure (phase X) during the hydrazine reduction process. The TEM energy-dispersive X-ray (EDS) spectrum of $MoO_xN_y$ NBs showed characteristic peaks for molybdenum, oxygen, carbon, and nitrogen. The relative nitrogen atomic percentage by element was about 2.1%. The presence of a nitrogen peak confirmed that nitrogen doping occurred during the hydrazine reduction process. Namely, the $MoO_3$ NBs were converted to $MoO_xN_y$ NBs (Equation 1), which is consistent with the XRD analysis (FIG. 2A).

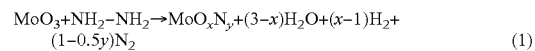

$$MoO_3+NH_2-NH_2 \rightarrow MoO_xN_y+(3-x)H_2O+(x-1)H_2+ (1-0.5y)N_2 \qquad (1)$$

In the Raman spectra of the CNF/GO, CNF/RGO, CNF/$GO/MoO_3$, and $CNF/RGO/MoO_xN_y$ aerogel films, two distinct peaks at 1338 and 1587 $cm^{-1}$, corresponding to the well-documented graphene D and G bands, respectively, were observed for all samples. The intensity ratio of the D and G bands (i.e., $I_D/I_G$) for CNF/RGO was 1.35, which was higher than that of CNF/GO (i.e., 1.06), thus indicating that the GO in the CNF/GO aerogel film was successfully reduced to RGO. Specifically, the increase of the $I_D/I_G$ value had previously been attributed to the creation of new $sp^2$ graphitic domains in RGO that were smaller in size than the ones present in the GO nanosheets before reduction, but more numerous in number. (See, S. Stankovich, et al., *Carbon.* 2007, 45, 1558.) The $I_D/I_G$ value for $CNF/GO/MoO_3$ (i.e., 1.18) was higher than that of CNF/GO (i.e., 1.06), which may be attributable to the addition of $MoO_3$ that enhanced the defect structures of the GO nanosheets. Furthermore, the $I_D/I_G$ value for the $CNF/RGO/MoO_xN_y$ aerogel film increased to 1.45, thus confirming that the GO in the $CNF/GO/MoO_3$ aerogel film was converted into RGO. In addition, thermogravimetric (TGA) and differential thermogravimetric (DTG) analysis also suggested that GO was successfully reduced to RGO in both the CNF/GO and $CNF/GO/MoO_3$ aerogel films during the hydrazine vapor reduction process. The CNF/GO and $CNF/GO/MoO_3$ aerogel films showed two major weight loss processes. The weight loss occurring in the temperature range of 150° C. to 230° C. was attributed to the loss of oxygen-containing groups from the GO. The weight loss occurring in the temperature range of 233° C. to 413° C. corresponded to the decomposition of CNFs in the CNF/GO and $CNF/GO/MoO_3$ aerogel films, which was confirmed by direct comparison with the TGA curves of pure CNF aerogels. There was only one major weight loss process shown in the TGA curves of the CNF/RGO and $CNF/RGO/MoO_xN_y$ aerogel films, and it was attributed to the decomposition of the CNFs. These results support the conclusion that GO was successfully reduced to RGO in both the CNF/GO and $CNF/GO/MoO_3$ aerogel films.

Figures 2E, 2F:
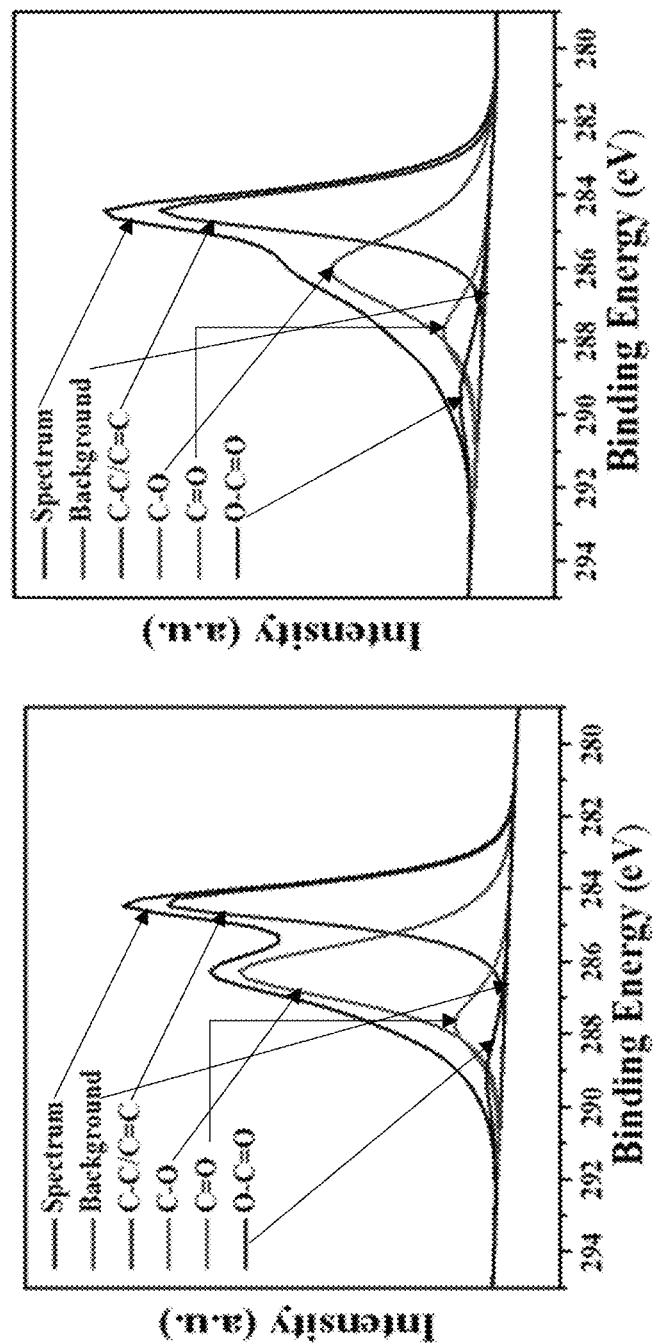
FIG. 2E. High-resolution C1s XPS spectra of a CNF/GO/MoO$_3$ aerogel film after 6 h hydrazine reduction.
FIG. 2F. High-resolution C1s XPS spectra of a CNF/GO/MoO$_3$ aerogel film after 12 h hydrazine reduction.

XPS was employed to further confirm the successful reduction of GO in the CNF/GO and $CNF/GO/MoO_3$ aerogel films. In order to investigate the effect of reduction on reduction and nitridation of $MoO_3$ NBs, the $CNF/GO/MoO_3$ aerogel films were subjected to hydrazine vapor at 120° C. for 6 h or 12 h. The intensity ratio of C1s to O1s gradually increased when the $CNF/GO/MoO_3$ aerogel film was subjected to 6 h and 12 h of hydrazine reduction. FIGS. 2D, 2E and 2F show the high-resolution C1s XPS spectra of the $CNF/GO/MoO_3$ aerogel film and the $CNF/GO/MoO_3$ aerogel film after either 6 h or 12 h of hydrazine reduction. The peak intensity of C=C/C—C of the $CNF/GO/MoO_3$ aerogel film increased significantly with increased reduction time, suggesting that GO was effectively reduced during the hydrazine vapor reduction process. Nevertheless, a relatively large number of oxygen-containing functional groups were still present after 12 h of reduction. These oxygen-containing functional groups were mainly attributed to the CNFs and $MoO_3$ NBs present in the aerogel films. Similar results were observed for CNF/GO aerogel films after being subjected to hydrazine vapor reduction.

Figure 2H:
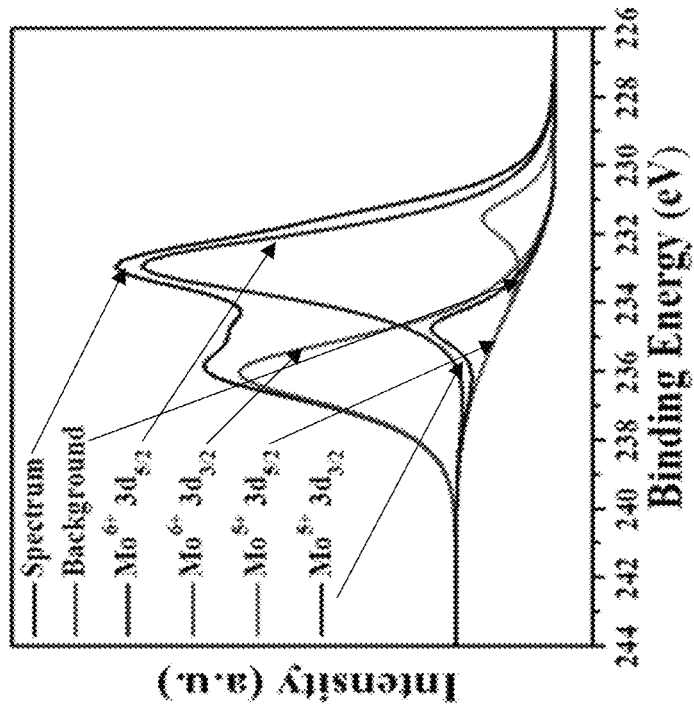
FIG. 2H. High-resolution Mo3d XPS spectra of a CNF/GO/MoO$_3$ aerogel film after 6 h hydrazine reduction.
Figure 2G:
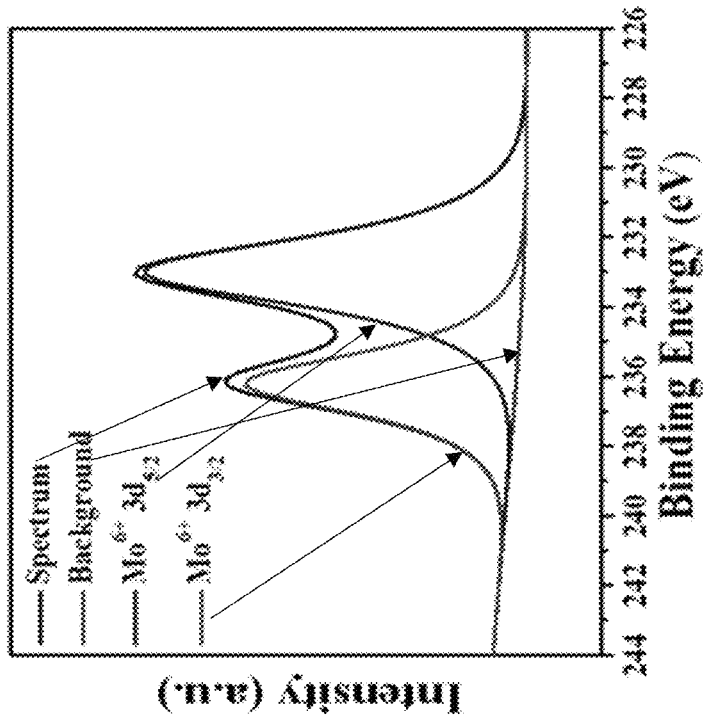
FIG. 2G. High-resolution Mo3d XPS spectra of a pristine CNF/GO/MoO$_3$ aerogel film.
Figure 2I:
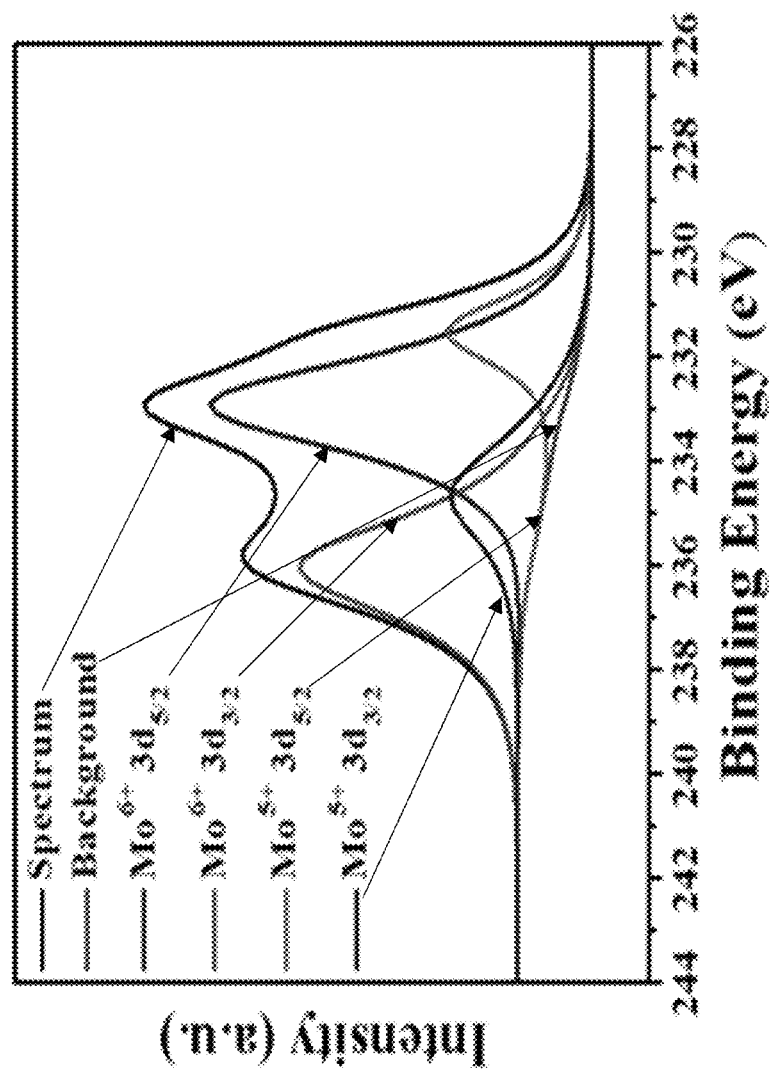
FIG. 2I. High-resolution Mo3d XPS spectra of a CNF/GO/MoO$_3$ aerogel film after 12 h hydrazine reduction.

FIGS. 2G, 2H and 2I show the high-resolution Mo3d XPS spectra of the CNF/GO/$MoO_3$, and the CNF/GO/$MoO_3$ aerogel film after either 6 h or 12 h of hydrazine reduction. As shown in FIG. 2G, two strong peaks at 232.9 eV and 236.0 eV can be attributed to $Mo^{6+}$ $3d_{5/2}$ and $Mo^{6+}$ $3d_{3/2}$, respectively, which are the characteristic peaks of $MoO_3$. After the CNF/GO/$MoO_3$ aerogel film was subjected to hydrazine reduction for 6 h, two new peaks at 231.5 eV and 234.8 eV were found and could be assigned to $Mo^{5+}$ $3d_{5/2}$ and $Mo^{5+}$ $3d_{3/2}$ (FIG. 2H), respectively, indicating that partial reduction of $Mo^{6+}$ occurred during the hydrazine reduction process. As shown in FIG. 2I, the peak intensities of $Mo^{5+}$ $3d_{5/2}$ and $Mo^{5+}$ $3d_{3/2}$ were further increased as the reduction time increased to 12 h.

As shown in the SEM images of FIGS. 3A and 3B, the highly porous microstructure of the CNF/GO/$MoO_3$ aerogel was largely preserved in the compressed CNF/GO/$MoO_3$ aerogel film. FIGS. 3C and 3D show SEM images of the bottom surface of a CNF/RGO/$MoO_xN_y$ aerogel film, from which it can be seen that the porous microstructure of the CNF/GO/$MoO_3$ aerogel film was very well preserved during the hydrazine vapor reduction process. The $MoO_3$ NBs were distributed uniformly in the aerogel film both before and after reduction. Furthermore, well stacked layers were observed in the cross-sectional SEM images of the CNF/RGO/$MoO_xN_y$ aerogel film (FIGS. 3E and 3F). In addition, a highly porous and layered microstructure was also observed for the CNF/RGO aerogel film electrode (i.e., without $MoO_xN_y$) (FIGS. 12A through 12F). The CNF/RGO/$MoO_xN_y$ and CNF/RGO aerogel film electrodes showed high BET surface areas of 186.3 and 169.2 $m^2/g$, respectively. The highly porous and layered microstructure of the compressed aerogel film electrode can facilitate the penetration of electrolytes and thus greatly enhance the electrolyte ion transport and charge transfer, thereby leading to superior supercapacitor performance.

The electrical conductivity of the pristine $MoO_3$ is very poor. However, after hydrazine reduction, the electrical conductivity of the CNF/RGO/$MoO_xN_y$ aerogel film with 30 wt. % $MoO_3$ (i.e., 20.2 S/m) was similar to that of the CNF/RGO aerogel film (22.1 S/m). This may be attributed to the partial reduction and nitrogen doping of the $MoO_3$ NBs, which was shown to greatly increase their electrical conductivity.

Figure 4D:
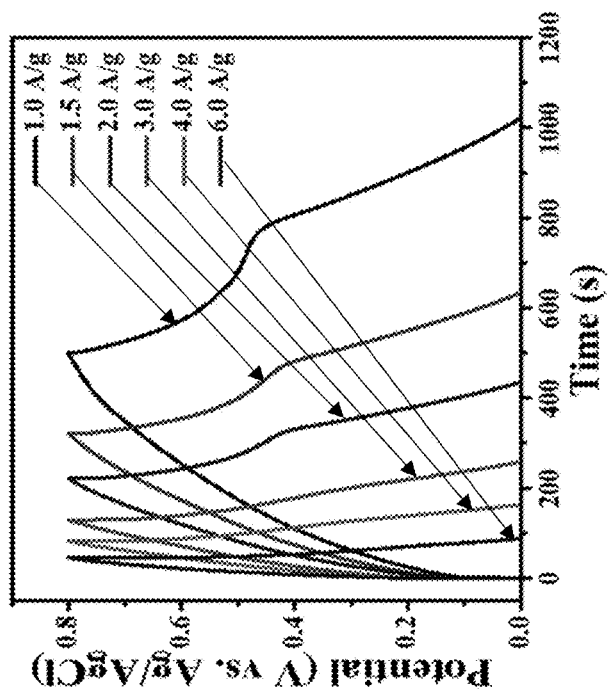
Figure 4C:
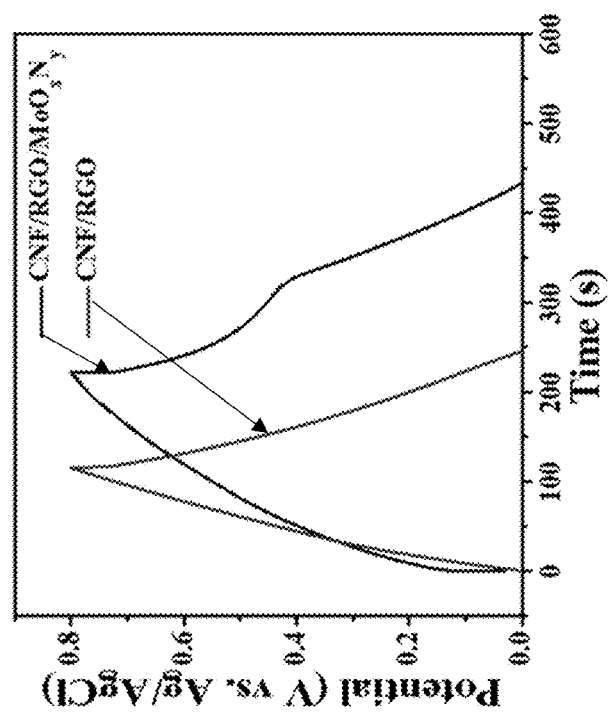

Electrochemical Performance of the CNF/RGO/$MoO_xN_y$ Aerogel Film Electrodes in a Three-Electrode System Free-standing and highly flexible CNF/RGO/$MoO_xN_y$ aerogel films were used as electrodes for supercapacitors, without the need of any binder or electroactive additives. In order to investigate the electrochemical performance of CNF/RGO/$MoO_xN_y$ aerogel film electrodes, various electrochemical characterizations were carried out in 1.0 M $H_2SO_4$ aqueous electrolyte in a three-electrode system. For comparison, a CNF/RGO aerogel film was also tested under the same conditions. FIG. 4A shows the cyclic voltammetry (CV) curves of the CNF/RGO and CNF/RGO/$MoO_xN_y$ aerogel film electrodes at a scan rate of 10 mV/s. The CNF/RGO/$MoO_xN_y$ aerogel film electrode exhibited a much higher capacitance than that of the CNF/RGO aerogel film, as demonstrated by a larger area enveloped in the CV curve. Specifically, some redox peaks, which may be ascribed to the redox reactions between various valences of Mo, appeared on the CV curve of the CNF/RGO/$MoO_xN_y$ aerogel film electrode. As shown in FIG. 4B, the CV curve of the CNF/RGO/$MoO_xN_y$ aerogel film electrode exhibited a similar feature with an increasing enveloped area as the scan rate increased from 5 to 100 mV/s, thus implying fast charge transfer. FIG. 4C shows the galvanostatic charge-discharge curves of the CNF/RGO and CNF/RGO/$MoO_xN_y$ aerogel film electrodes at a current density of 2 A/g. The CNF/RGO aerogel film electrode exhibited a relatively symmetrical triangular shape suggesting ideal electric double-layer capacitive behavior, while the CNF/RGO/$MoO_xN_y$ aerogel film electrodes exhibited distinct pseudocapacitive behavior, which is consistent with the CV measurements. FIG. 4D shows the galvanostatic charge-discharge curves of the CNF/RGO and CNF/RGO/$MoO_xN_y$ aerogel film electrodes at various current densities. The specific capacitances at various current densities were calculated from the discharge curve and are presented in FIG. 4E. Remarkably, the free-standing CNF/RGO/$MoO_xN_y$ aerogel film electrode delivered an outstanding specific capacitance of 680 F/g in 1.0 M $H_2SO_4$ aqueous electrolyte in a three-electrode configuration at a current density of 1.0 A/g, which is much higher than that of the CNF/RGO aerogel film electrode (388 F/g), and is among the highest values for other types of carbon/metal oxide-based electrodes. (See, X. Xiao, et al., *Nano Energy*. 2014, 9, 355; K. Zhou, et al., *Nano Energy*. 2015, 12, 510; D. Hanlon, et al., *Chemistry of Materials*. 2014, 26, 1751; K. Liang, et al., *Nano Energy*. 2014, 9, 245; G. Yu, et al., *Nano Letters*. 2011, 11, 4438.) The enhanced specific capacitance of the CNF/RGO/$MoO_xN_y$ aerogel film electrode was attributed to the synergistic electrochemical effect of the graphene, based on the electric double-layer ion absorption; and to the pseudocapacitive MoOxNy, based on the fast faradic redox reaction. Furthermore, the CNF/RGO/$MoO_xN_y$ aerogel film electrode still exhibited a specific capacitance of 421 A/g when the current density was increased to 15 A/g (i.e., 62% of the capacitance measured at a current density of 1.0 A/g), indicating that the electrode had a good capacitance retention capability due to the highly open and continuous porous structure of the aerogel film electrode, which facilitated ion diffusion and charge transport.

Figures 4E, 4F:
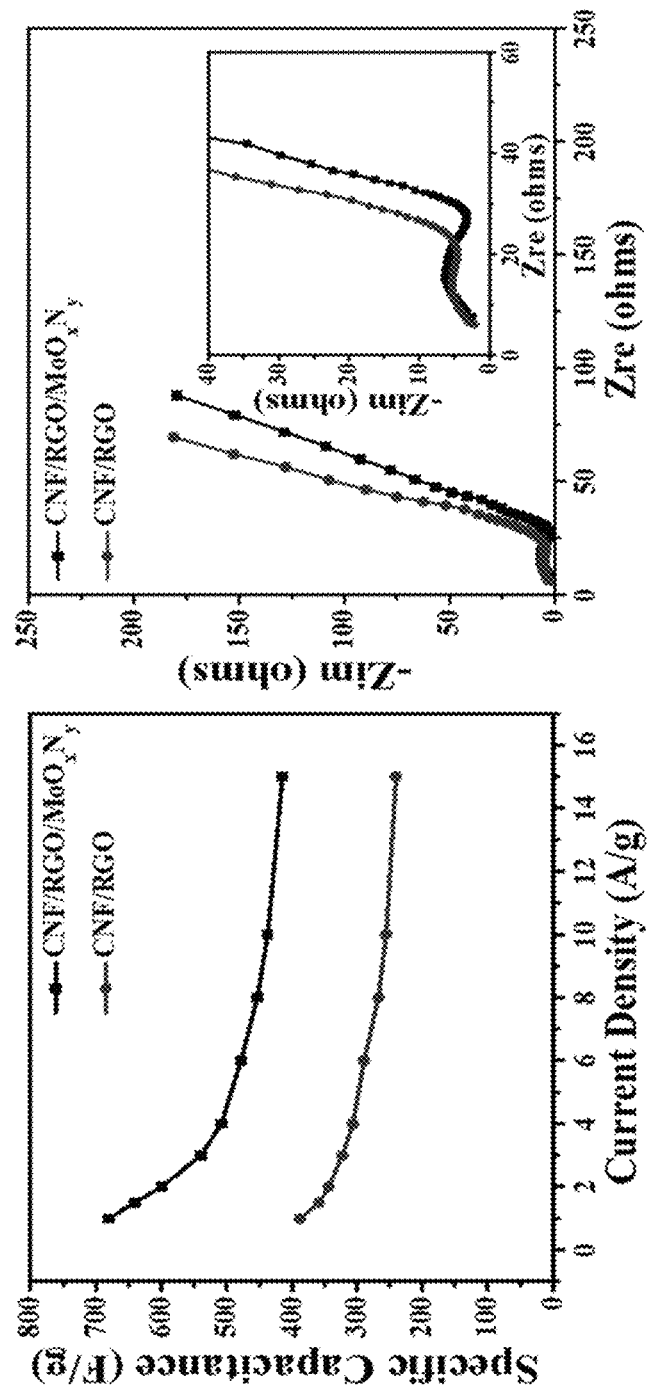

Electrochemical impedance spectroscopy (EIS) was studied to further understand the electrochemical properties of the CNF/RGO and CNF/RGO/$MoO_xN_y$ aerogel film electrodes. FIG. 4F shows the Nyquist impedance plots of the CNF/RGO and CNF/RGO/$MoO_xN_y$ aerogel film electrodes in the frequency range of 0.01 Hz to 100 kHz, both of which exhibited a semicircle at the high frequency range and a straight line at the low frequency range. The equivalent series resistance ($R_{ESR}$) of the CNF/RGO/$MoO_xN_y$ aerogel film electrode was 7.7Ω, which was close to that of the CNF/RGO aerogel film electrode (6.1Ω). Both CNF/RGO/$MoO_xN_y$ and CNF/RGO aerogel films exhibited a small semicircle at the high frequency range, indicating a low charge transfer resistance. Furthermore, the introduction of molybdenum oxynitride did not affect the charge diffusion process as attested to by the similar slopes of the straight lines in the low frequency range of the Nyquist impedance plots of the CNF/RGO and CNF/RGO/$MoO_xN_y$ aerogel film electrodes. The EIS results confirmed that both CNF/RGO and CNF/RGO/$MoO_xN_y$ aerogel film exhibited low charge transfer resistance and fast ion diffusion, which was attributed to the highly porous microstructure exhibited by aerogel and the superior wettability of the CNFs. The porous CNF-based aerogel microstructure likely served as electrolyte nano-reservoirs, thereby providing good diffusion channels for electrolyte ions, and enabling the active materials (i.e., RGO and/or $MoO_xN_y$) in the electrode to be in direct contact with the electrolyte and thus decreasing the distance of ions diffusion.

Figure 5C:
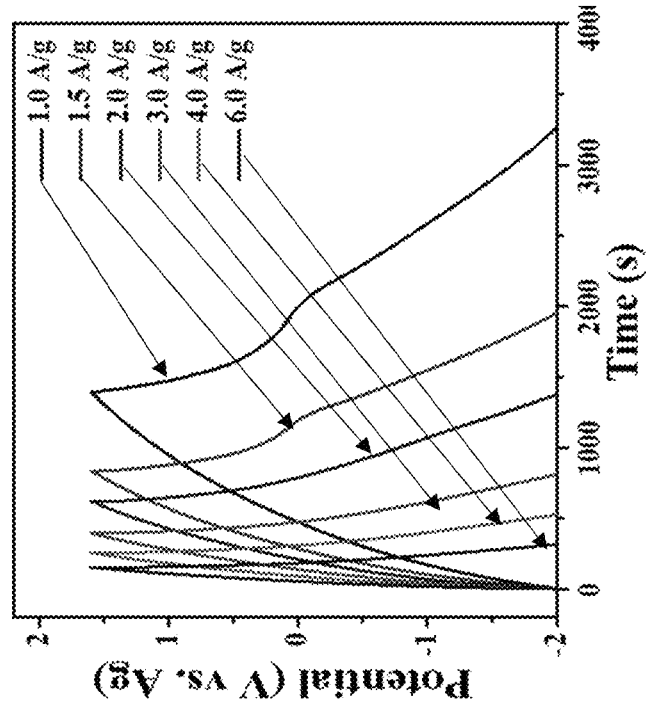
Figure 5D:
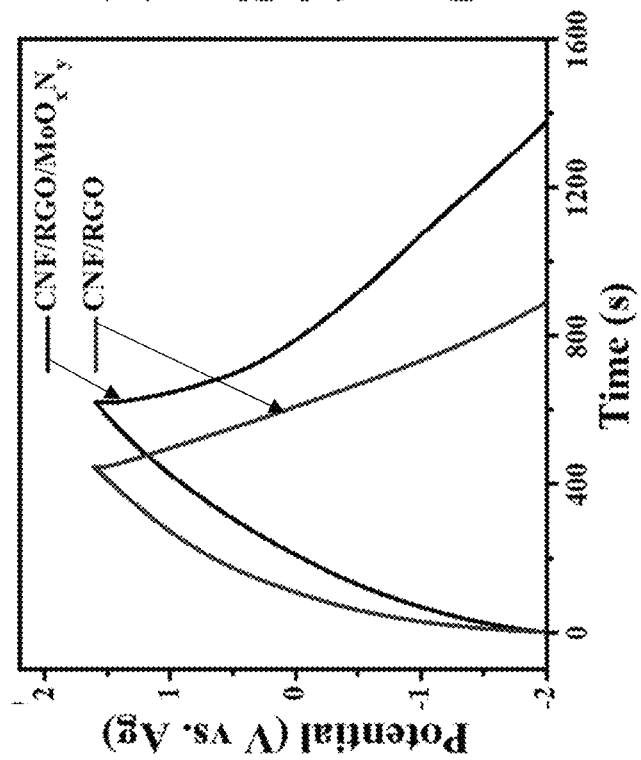
Figures 5E, 5F:
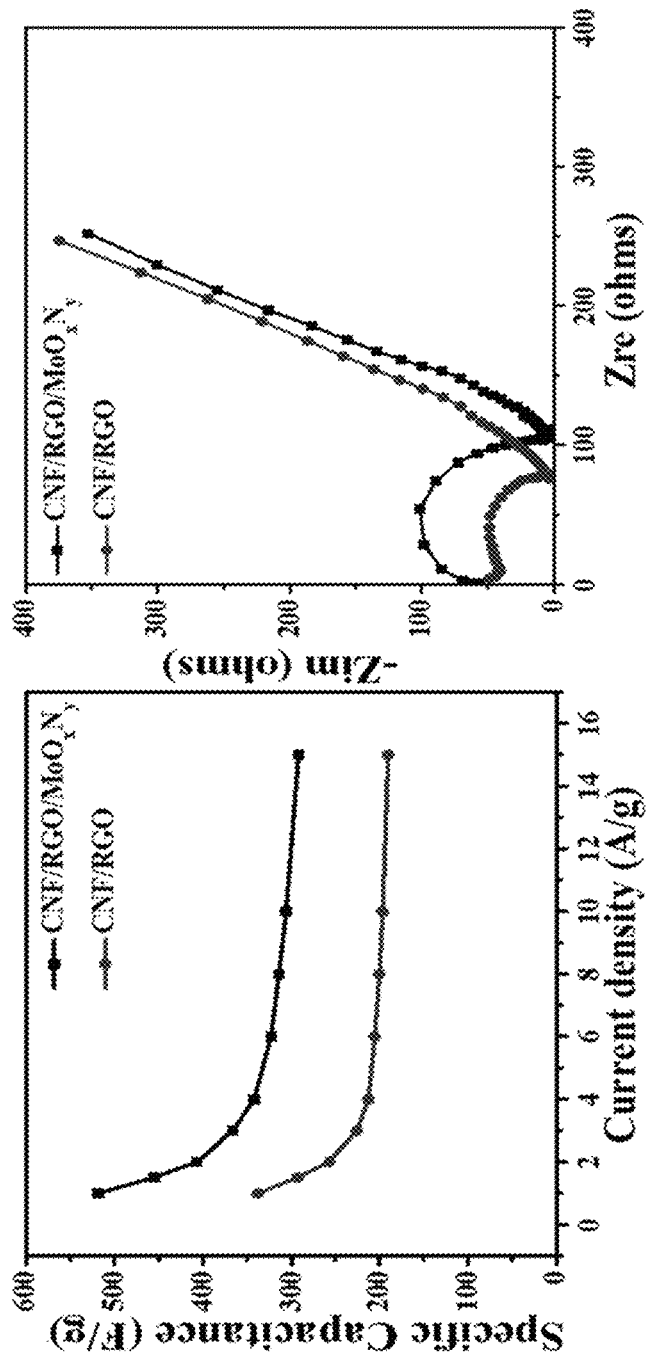

Room-temperature ionic liquids (ILs), possessing good thermal stability, high ion density, and a wide operating potential window, were also examined as electrolytes for the supercapacitors based on these two types of aerogel film electrodes. FIGS. 5A and 5B show the electrochemical characterization of the CNF/RGO and CNF/RGO/$MoO_xN_y$ aerogel film electrodes in a 50 vol. % [BMPY][$NTf_2$] acetonitrile solution in a three-electrode system with a potential window of 2.0 to 1.6 V. The CNF/RGO/$MoO_xN_y$ aerogel film electrode exhibited a larger CV area than the CNF/RGO aerogel film electrode (FIG. 5A), similar to what was observed for the $H_2SO_4$ aqueous electrolytes. Furthermore, both CNF/RGO and CNF/RGO/$MoO_xN_y$ aerogel film electrodes showed an increasing enveloped area with increasing scan rate due to the fast charge transfer (FIG. 5B). As shown in FIG. 5C, the CNF/RGO/$MoO_xN_y$ aerogel film electrode exhibited a longer discharge time, corresponding to a higher capacitance, than the CNF/RGO aerogel film electrodes (616 s vs. 430 s) at a current density of 2 A/g. FIG. 5D shows the galvanostatic charge-discharge curves of the CNF/RGO and CNF/RGO/$MoO_xN_y$ aerogel film electrodes at various current densities. As shown in FIG. 5E, the free-standing CNF/RGO/$MoO_xN_y$ aerogel film electrode delivered an outstanding specific capacitance of 518 F/g in a 50 vol. % [BMPY][$NTf_2$] acetonitrile electrolyte solution in a three-electrode configuration at a current density of 1.0 A/g, which again was much higher than that of the CNF/RGO aerogel film electrode (335 F/g), owing to the fast faradic redox reaction of $MoO_xN_y$. Although the specific capacitance the CNF/RGO/$MoO_xN_y$ aerogel film electrode in 50 vol. % [BMPY][$NTf_2$] acetonitrile electrolyte solution was slightly less than that in the 1.0 M $H_2SO_4$ aqueous electrolyte, the capacitance was still significantly higher than other reported work with an IL electrolyte. (See, C. Peng, et al., *Chemsuschem.* 2014, 7, 777; M. Shi, et al., *Chemsuschem.* 2014, 7, 3053; C.-H. Yang, et al., *Chemsuschem.* 2015, 8, 1779; H. Liu, et al., *Electrochim Acta.* 2006, 51, 1925.) This phenomenon was attributed to the highly open and continuous porous structure of the aerogel film electrode that facilitated ion diffusion and charge transport, as well as the aggregation of the graphene that was effectively prevented by both the CNFs and the MoOxNy nanobelts. Furthermore, the CNF/RGO/$MoO_xN_y$ aerogel film electrode still retained 56% of the capacitance measured at 1 A/g when the current density increased to 15 A/g (292 F/g). FIG. 5F shows the Nyquist impedance plots of the CNF/RGO and CNF/RGO/$MoO_xN_y$ aerogel film electrodes in the frequency range of 0.01 Hz to 100 kHz. The CNF/RGO and CNF/RGO/$MoO_xN_y$ aerogel film electrodes exhibited a similar slope in the low frequency range; however, the CNF/RGO/$MoO_xN_y$ aerogel film electrode showed a larger diameter than the CNF/RGO aerogel film at the high frequency range, which may be ascribed to the slightly slower redox reaction of $MoO_xN_y$ NBs in the IL electrolyte that increased the charge transfer resistance.

Electrochemical Performance of Highly Flexible and All-Solid-State Supercapacitors To further explore the advantages of CNF/RGO/$MoO_xN_y$ aerogel films in flexible and wearable electronic devices, the CNF/RGO/$MoO_xN_y$ aerogel film was used to fabricate all-solid-state-flexible symmetric supercapacitors using polyethylene terephthalate (PET) as a thin flexible substrate and PVA-$H_2SO_4$ hydrogel or PVDF-P407-[BMPY][$NTf_2$] ionogel as the electrolyte and separator (FIG. 6A). The use of gel electrolytes can reduce the thickness and weight of the supercapacitor, avoid harmful leakage of liquid electrolytes, and simplify the fabrication process since it does not require any special packaging. The all-solid-state supercapacitors are highly flexible and can be easily bent, which accounts for the excellent mechanical properties and flexibility of the aerogel films.

Figure 6B:
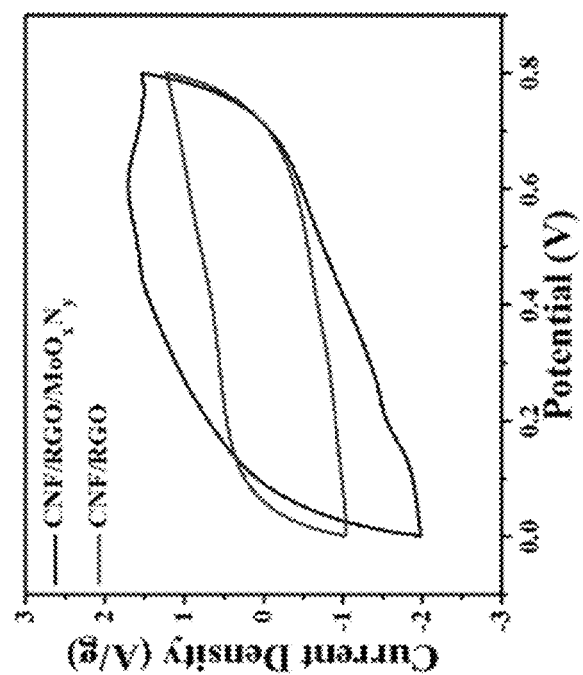
FIGS. 6B-6H depict the electrochemical characterization of all-solid-state supercapacitors employing PVA-H$_2$SO$_4$ hydrogel as the electrolyte.
Figure 6D:
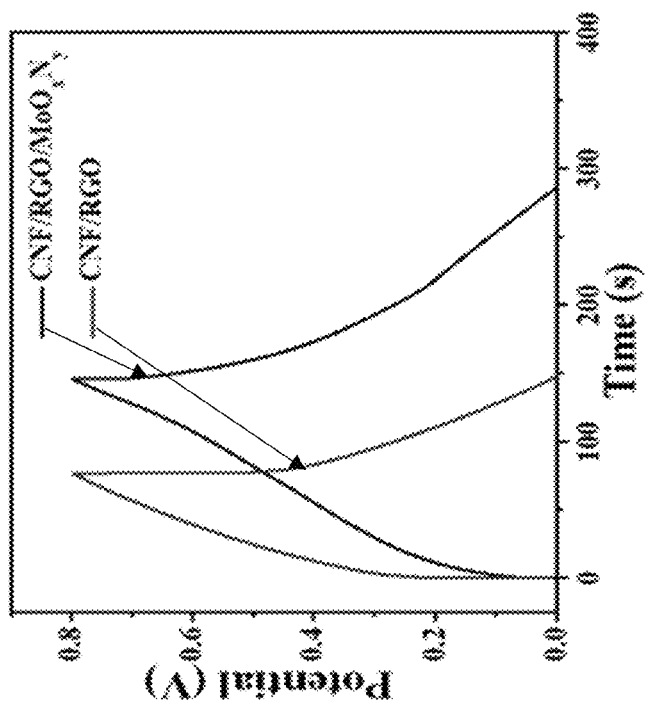
Figure 6C:
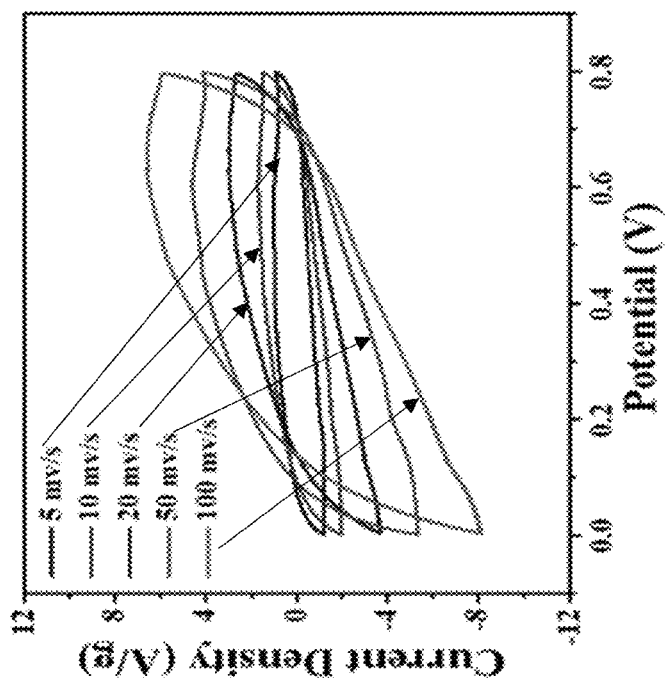
Figures 6E, 6F:
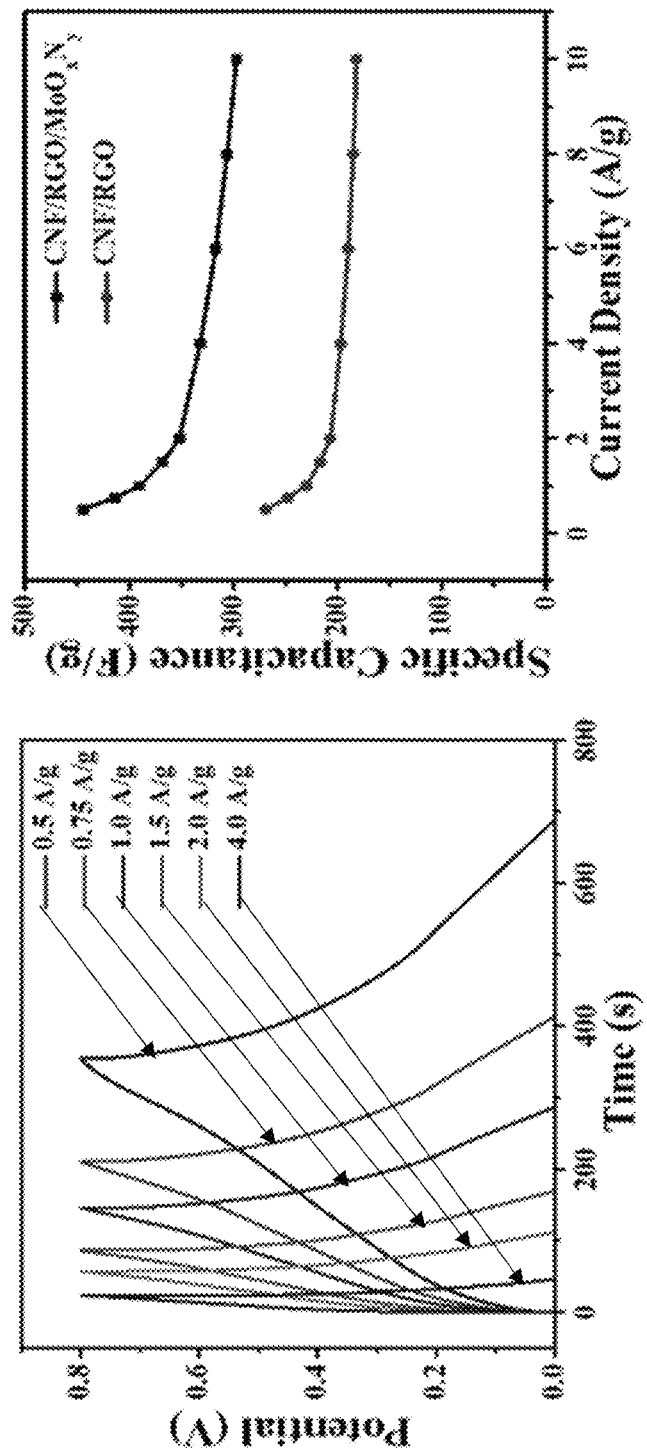

Similar to the supercapacitors employing liquid electrolytes, the all-solid-state supercapacitors using the CNF/RGO/$MoO_xN_y$ aerogel films as electrodes showed a much higher capacitance than those using the CNF/RGO aerogel films as electrodes, as demonstrated by a larger CV enveloped area (FIG. 6B) and a longer discharge time (FIG. 6D). FIG. 6C presents the CV curves of the CNF/RGO/$MoO_xN_y$ aerogel film-based all-solid-state supercapacitors at scan rates ranging from 5 to 100 mV/s, of which all exhibited a similar shape without apparent distortion even when the scan rate was increased to 100 mV/s, implying fast ion transport and charge transfer in the PVA-$H_2SO_4$ hydrogel electrolyte. FIG. 6E shows nearly triangular and symmetrical shapes of charge-discharge curves of the CNF/RGO and CNF/RGO/$MoO_xN_y$ aerogel film-based all-solid-state supercapacitors at various current densities, indicating excellent capacitive behavior of the solid-state supercapacitors. The specific capacitances at various current densities were calculated from the discharge curve and are presented in FIG. 6F. Remarkably, the specific capacitance of the CNF/RGO/$MoO_xN_y$ aerogel film-based all-solid-state supercapacitor was calculated to be 444 F/g at a current density of 0.5 A/g, which is among the highest values reported for other types of solid-state supercapacitors. (See, X. Xiao, et al., *Nano Energy.* 2014, 9, 355; B. Yao, et al., *Adv Mater.* 2016, 28, 6353; Q. Zheng, et al., *Acs Appl Mater Inter.* 2015, 7, 3263; K. Zhou, et al., *Nano Energy.* 2015, 12, 510.) In addition, the solid-state supercapacitor also exhibited an excellent volumetric capacitance of 73.4 F/$cm^3$, and an extremely high areal capacitance of 1110 mF/$cm^2$. When the current density was increased to 10 A/g, the CNF/RGO/$MoO_xN_y$ aerogel film-based all-solid-state supercapacitor still maintained 68% of the specific capacitance measured at 0.5 A/g (i.e., 300 vs. 444 F/g).

Figure 6H:
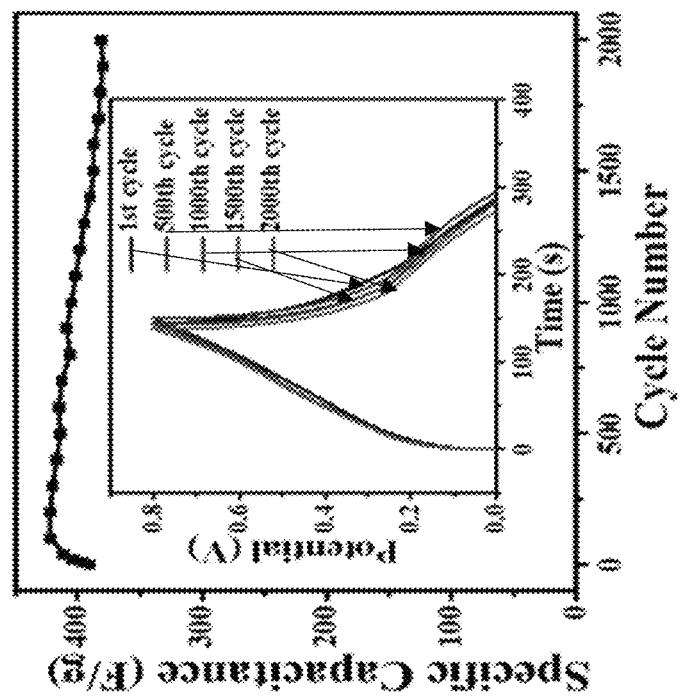
Figure 6G:
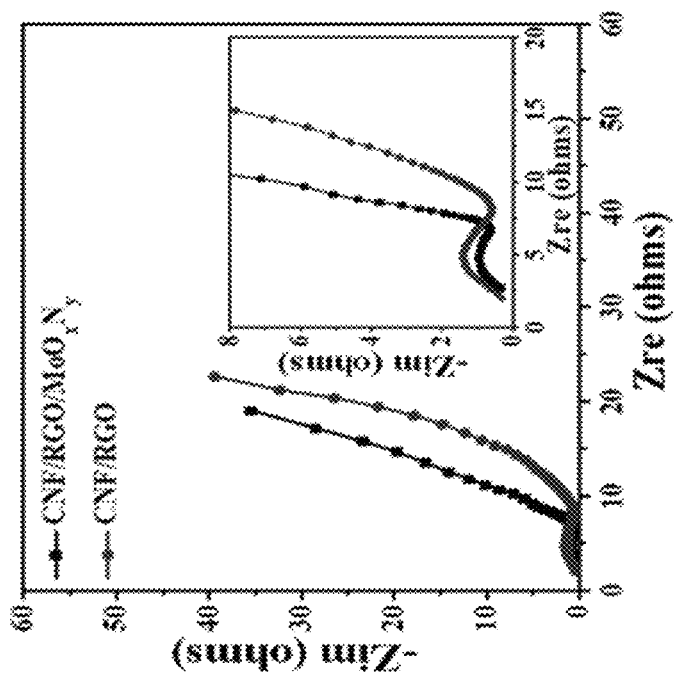

Both CNF/RGO and CNF/RGO/$MoO_xN_y$ aerogel film-based all-solid-state supercapacitors exhibited a semicircle at the high frequency range and a straight line at the low frequency range in the Nyquist impedance plots (FIG. 6H). In particular, both supercapacitors showed a very low $R_{ESR}$ of ~2.5Ω; nevertheless, the CNF/RGO/$MoO_xN_y$ aerogel film-based all-solid-state supercapacitor exhibited a slightly lower charge transfer resistance, which may be attributable to the excellent mechanical properties of the $MoO_xN_y$ NBs that can maintain the porous structure in the PVA-$H_2SO_4$ hydrogel electrolyte. The electrochemical cyclic stability, which is a very important property for the practical application of all-solid-state supercapacitors, was evaluated by galvanostatic charge-discharge for 2000 cycles at a current density of 1 A/g. As shown in FIG. 6I, the specific capacitance increased from 390 to 422 F/g after the first 200 cycles, which may be attributable to the improved ion accessibility in the porous CNF/RGO/$MoO_xN_y$ aerogel film after repetitive charge-discharge cycles. Thereafter, the specific capacitance underwent a very minor decrease and still retained a capacitance of 381 F/g after 2000 cycles (98% capacitance retention).

Figure 7B:
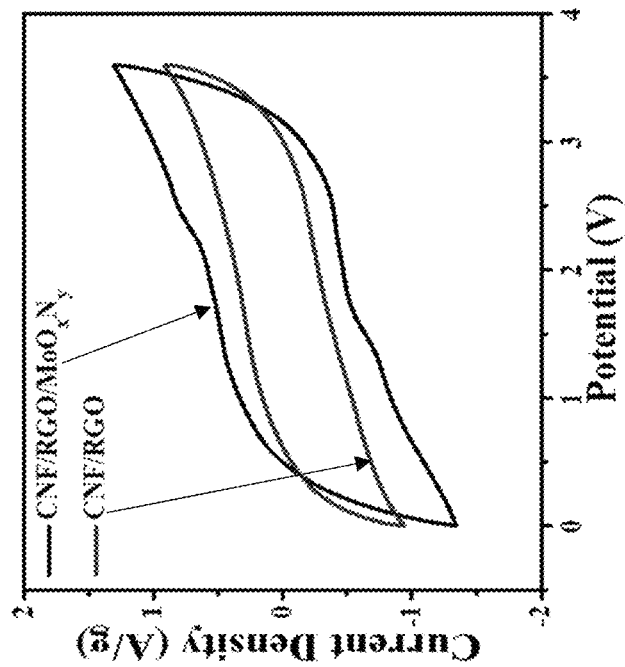
FIGS. 7A-7F depict the electrochemical characterization of the all-solid-state supercapacitors employing PVDF-P407-[BMPY][NTf$_2$] ionogel as the electrolyte.
Figure 7A:
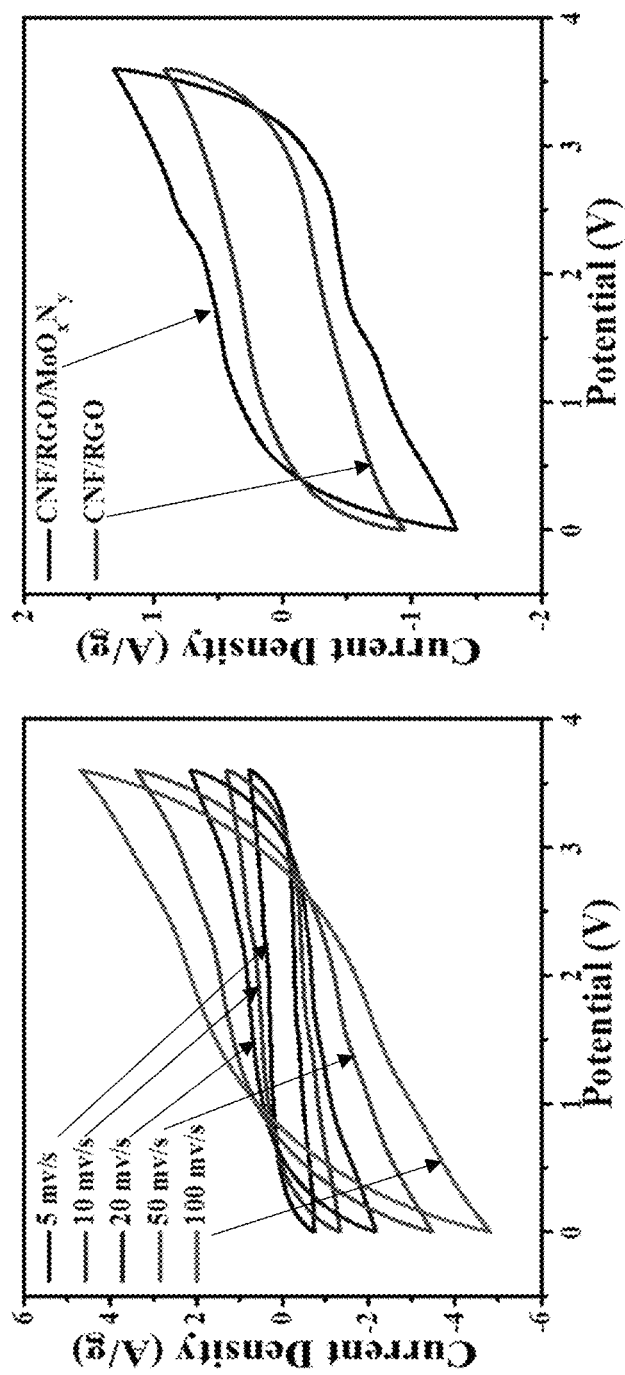
Figure 7D:
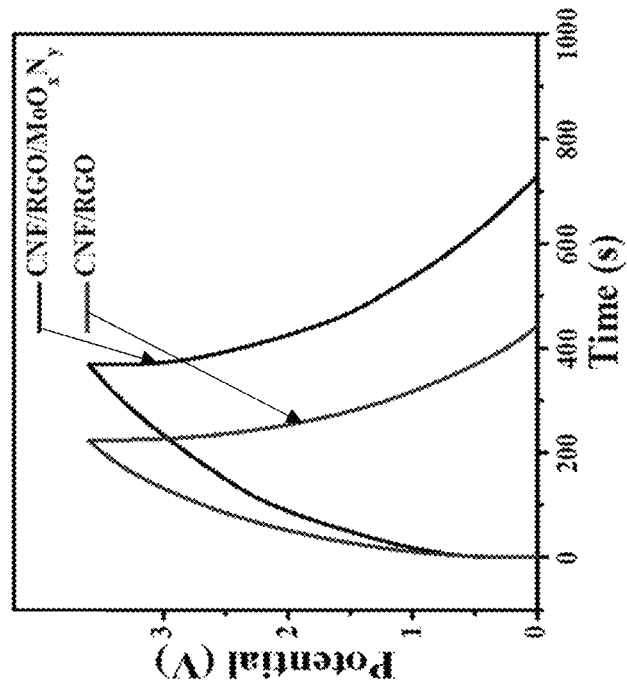
Figure 7C:
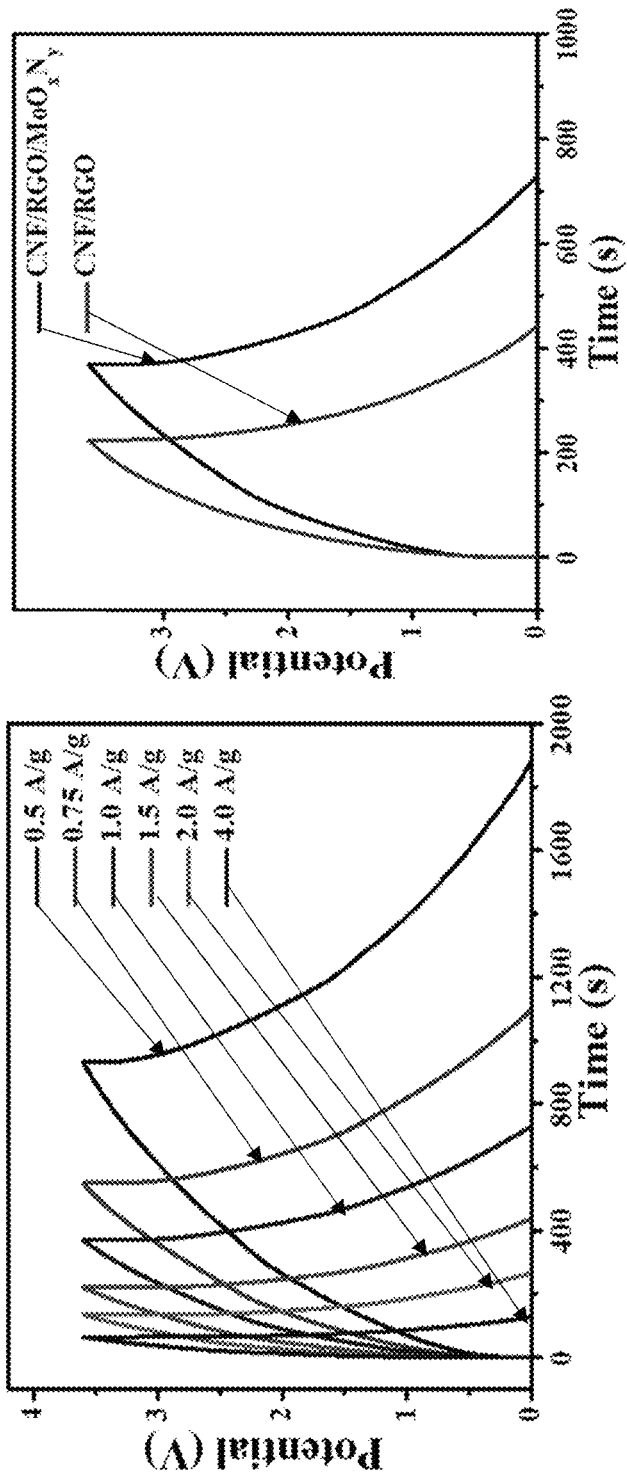
Figures 7E, 7F:
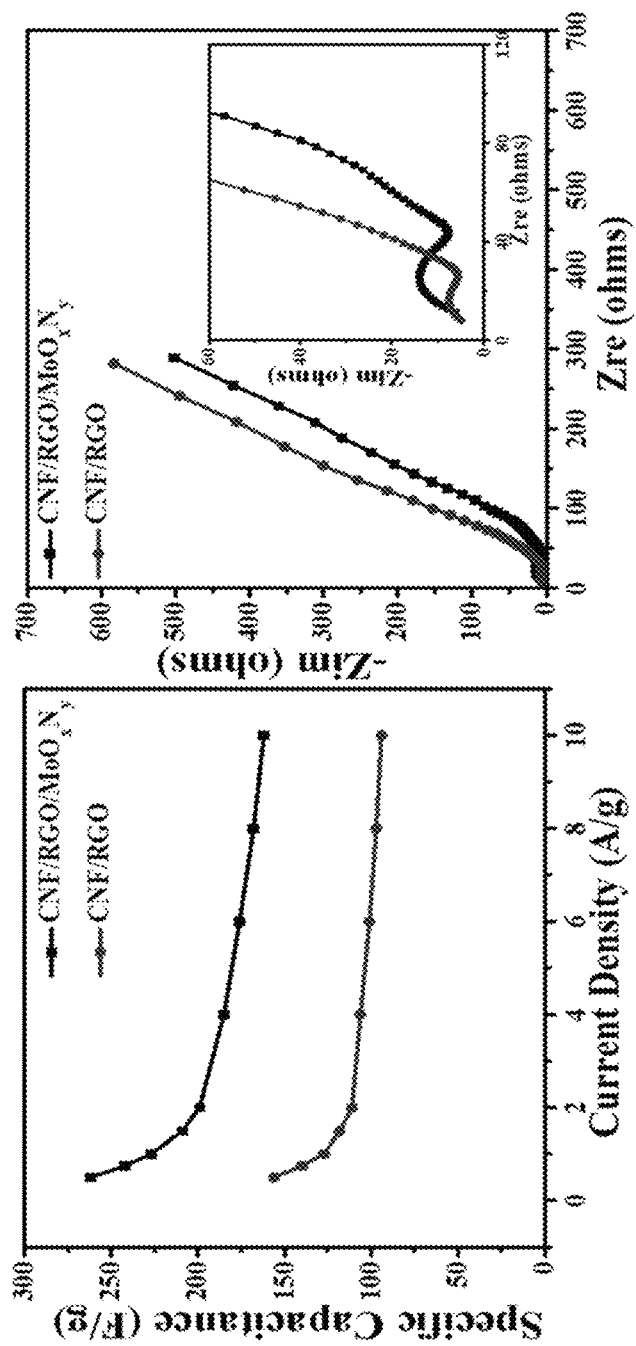
Figures 8A, 8B:
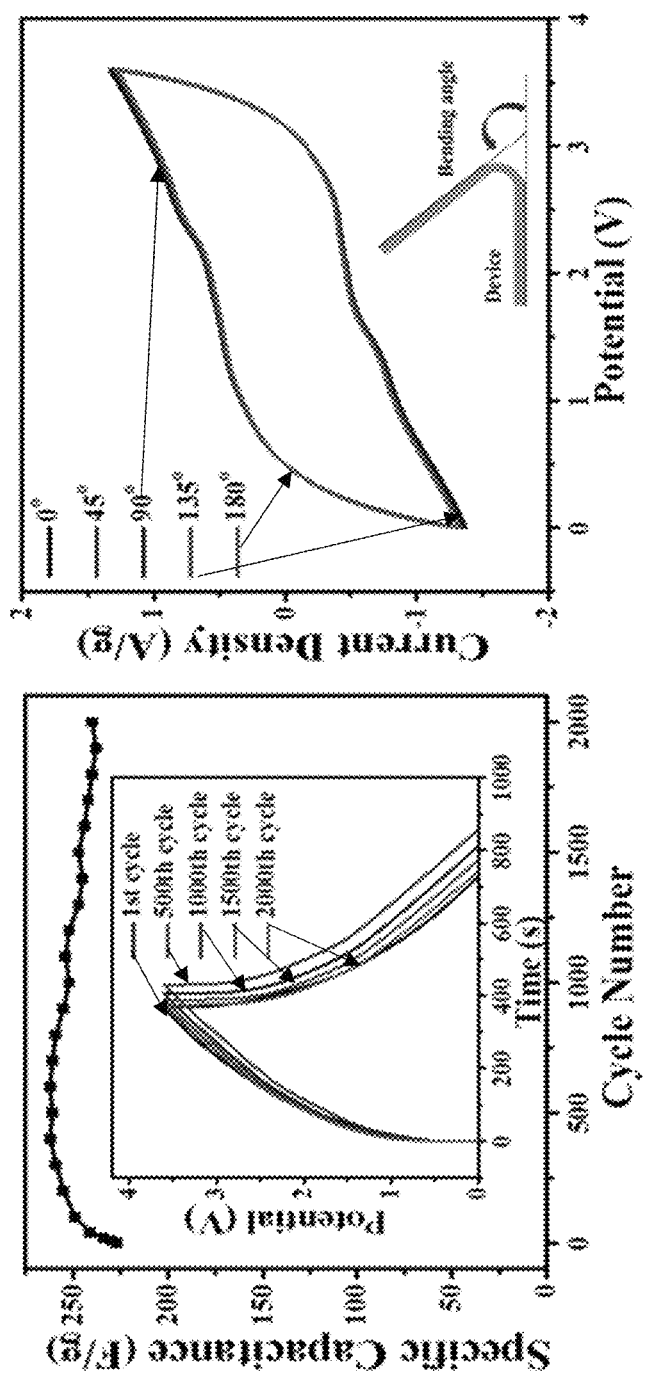
FIGS. 8A-8E shows the characterization of the all-solid-state supercapacitors employing PVDF-P407-[BMPY][NTf$_2$] ionogel as the electrolyte.

After optimizing the formulation, an ionogel electrolyte containing 92 wt. % [BMPY][$NTf_2$], 4 wt. % PVDF, and 4 wt. % P407 was developed and used to fabricate ionogel-based solid-state supercapacitors. FIGS. 7A through 7F shows various electrochemical characterizations for these ionogel-based solid-state supercapacitor devices at a potential window of 0 to 3.6 V. Both CNF/RGO and CNF/RGO/MoO$_x$N$_y$ aerogel film-based all-solid-state supercapacitors exhibited excellent capacitive behaviors with very rapid current responses in CV curves (FIG. 7B) and low IR (I: current, R: resistance) drops in charge-discharge curves (FIG. 7D). Furthermore, the CNF/RGO/MoO$_x$N$_y$ aerogel film-based all-solid-state supercapacitors exhibited higher capacitance than that of CNF/RGO at various measured current densities. For instance, at a current density of 0.5 A/g, the specific capacitances for CNF/RGO and CNF/RGO/MoO$_x$N$_y$ aerogel film-based all-solid-state supercapacitors were 157 and 262 F/g, respectively. In addition, when the current density was increased to 10 A/g, the CNF/RGO/MoO$_x$N$_y$ aerogel film-based all-solid-state supercapacitor still retained a specific capacitance of 163 F/g (62.2% capacitance retention). FIG. 7F showed the Nyquist impedance plots for the CNF/RGO and CNF/RGO/MoO$_x$N$_y$ aerogel film-based all-solid-state supercapacitors employing PVDF-P407-[BMPY][NTf$_2$] ionogel as the electrolyte. Both supercapacitors had a very low R$_{ESR}$, while the CNF/RGO/MoO$_x$N$_y$ aerogel film-based all-solid-state supercapacitor exhibited a slightly higher charge transfer resistance than the CNF/RGO. As shown in FIG. 8A, the electrochemical stability of the CNF/RGO/MoO$_x$N$_y$ aerogel film-based all-solid-state supercapacitor employing PVDF-P407-[BMPY][NTf$_2$] ionogel as the electrolyte was also investigated by a charge-discharge test for 2000 cycles at a current density of 1.0 A/g. The specific capacitance increased from 227 to 262 F/g after the first 400 cycles, which may be attributable to the improved ion accessibility in the porous CNF/RGO/MoO$_x$N$_y$ aerogel film after repetitive charge-discharge cycles. The specific capacitance then started to decrease slowly thereafter, but it still retained a specific capacitance of 240 F/g after 2000 cycles (106% capacitance retention). This finding demonstrates that the supercapacitor made from the CNF/RGO/MoO$_x$N$_y$ aerogel film had superior cycle stability, which may be attributed to the interpenetrating structure formed between the porous aerogel electrodes and the PVDF-P407-[BMPY][NTf$_2$] ionogel electrolyte. The SEM images showed that the CNF/RGO/MoO$_x$N$_y$ electrode was infiltrated with the electrolyte, and no apparent microstructure change was observed after 2000 charge-discharge cycles.

Figure 8C:
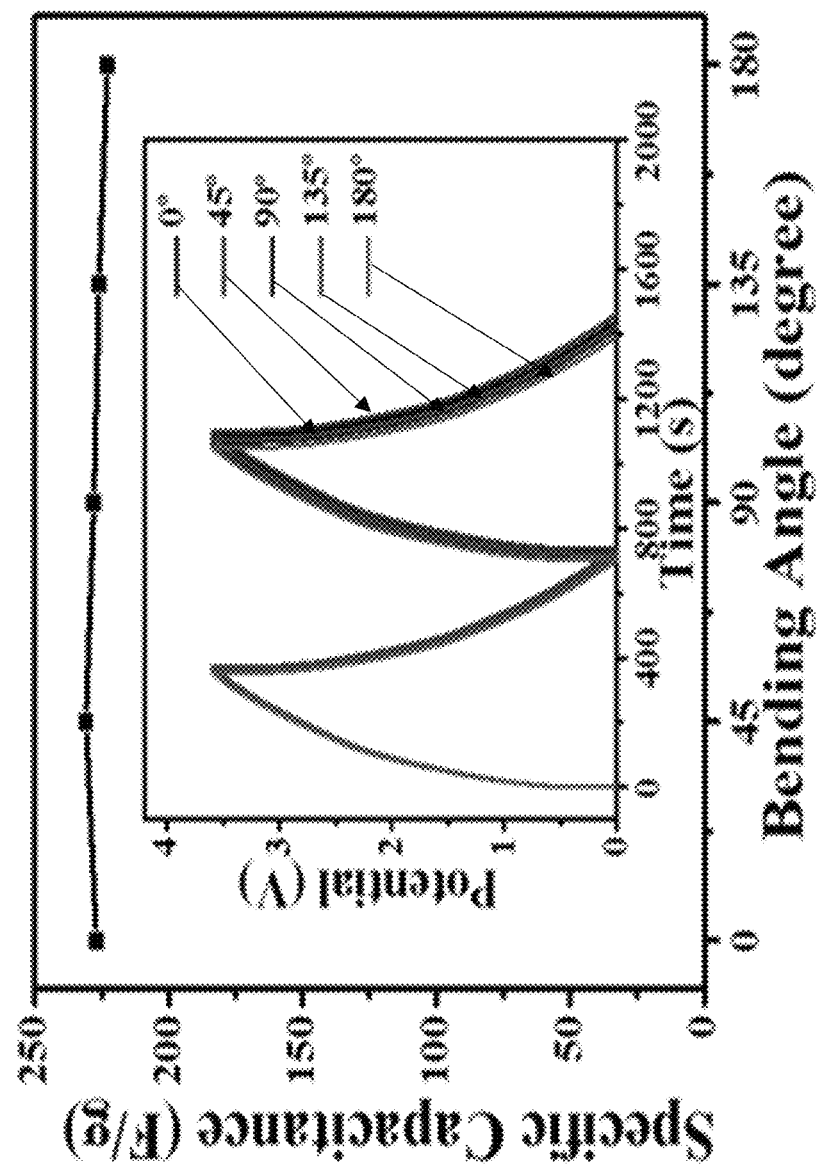

Flexibility, which is another important parameter for future energy storage devices that allow for the devices to be easily rolled up, was examined using a bending test. As shown in FIG. 8B, bending had almost no effect on the CV curves of the CNF/RGO/MoO$_x$N$_y$ aerogel film-based all-solid-state supercapacitor employing either the PVA-H$_2$SO$_4$ hydrogel or PVDF-P407-[BMPY][NTf$_2$] ionogel as the electrolyte; hence, it could be bent arbitrarily without degrading performance. In addition, the values of specific capacitances remained almost unchanged when the bending angle was increased from 0 to 180° at a current density of 1 A/g (FIG. 8C), demonstrating that these solid-state supercapacitors were highly flexible and completely recoverable.

Figures 8D, 8E:
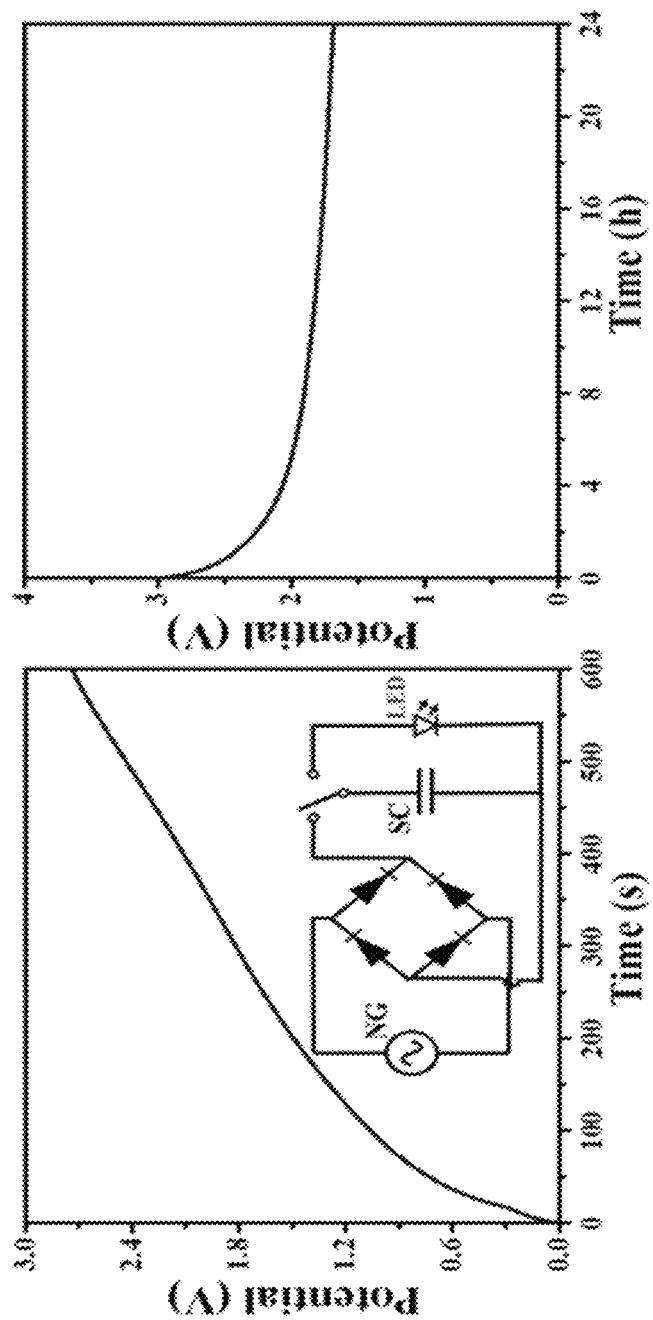

A porous CNF/PDMS aerogel film-based nanogenerator (NG) had been previously developed. (See, Q. Zheng, et al., High-Performance Flexible Piezoelectric Nanogenerators Consisting of Porous Cellulose Nanofibril (CNF)/Poly(dimethylsiloxane) (PDMS) Aerogel Films. *Nano Energy*.) The porous CNF/PDMS aerogel film-based NG could generate an open-circuit voltage (V$_{oc}$) of 40.1 V and a short-circuit current (I$_{sc}$) of 8.2 µA under a compressive stress of 0.04 MPa. The NG was used to charge the CNF/RGO/MoO$_x$N$_y$ aerogel film-based all-solid-state supercapacitor employing PVDF-P407-[BMPY][NTf$_2$] ionogel as the electrolyte through a bridge rectifier. As shown in FIG. 8D, the supercapacitor could be easily charged up to 2.6 V within 10 min, and the NG-charged solid-state supercapacitor could easily light up an LED light.

Self-discharge is of great concern for practical applications. FIG. 8E shows the self-discharge curve of a CNF/RGO/MoO$_x$N$_y$ aerogel film-based all-solid-state supercapacitor employing PVDF-P407-[BMPY][NTf$_2$] ionogel as the electrolyte after being charged at 3.0 V for 10 min. The supercapacitor underwent a rapid self-discharge in the first two hours. Thereafter, it exhibited a near plateau region where the potential decreased very slowly. In particular, the supercapacitor still maintained an output voltage of 1.70 V after 24 h. As a demonstration, a highly flexible and all-solid-state supercapacitor was charged at a constant potential of 3.0 V for 10 min and then used to light up a red LED with a minimum operating potential of 1.65 V. One single supercapacitor device can light the LED very well for about four hours. Previously reported supercapacitor devices generally required connecting several supercapacitor devices in series in order to light up one LED. (See, B. Yao, et al., *Adv Mater*. 2016, 28, 6353; Q. Zheng, et al., *Acs Appl Mater Inter*. 2015, 7, 3263; K. Zhou, et al., *Nano Energy*. 2015, 12, 510.)

Figure 9A:
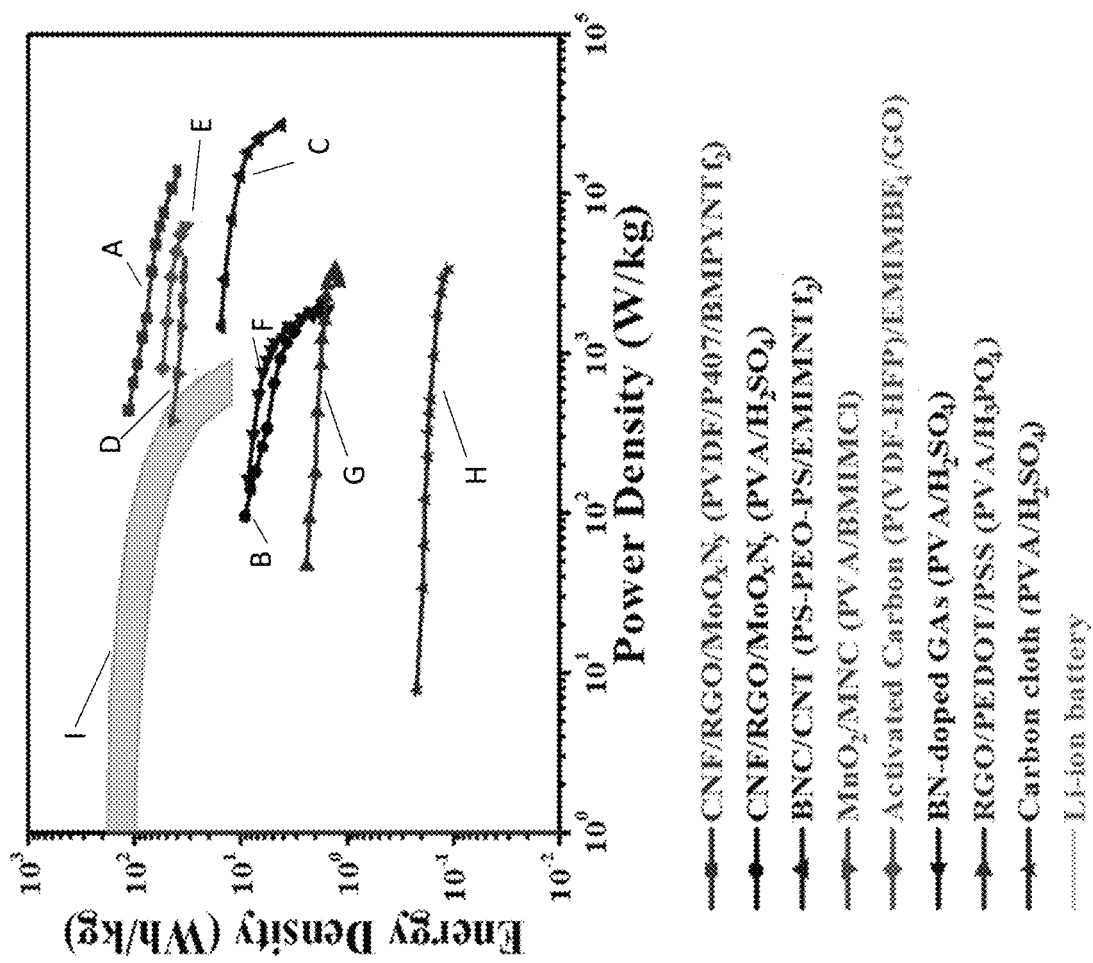
FIG. 9A is a Ragone plot per mass of the all-solid-state supercapacitors employing PVA-H$_2$SO$_4$ hydrogel or PVDF-P407-[BMPY][NTf$_2$] ionogel as the electrolyte, compared with several commercial energy storage systems, as well as supercapacitors previously reported.

To further demonstrate the superior performance of the CNF/RGO/MoO$_x$N$_y$ aerogel film-based all-solid-state supercapacitors, the energy and power densities of the supercapacitors employing either hydrogel or ionogel as the electrolyte were calculated. As summarized in a Ragone plot based on the mass (FIG. 9A), the CNF/RGO/MoO$_x$N$_y$ aerogel film-based all-solid-state supercapacitor employing PVA-H$_2$SO$_4$ hydrogel as the electrolyte exhibited much higher energy density (i.e., 9.2 Wh/kg) compared to carbon cloth or RGO/PEDOT/PSS-based solid-state supercapacitors employing hydrogel as the electrolyte. (See, G. Wang, et al., *Adv Mater*. 2014, 26, 2676; Y. Liu, et al., *Sci Rep-Uk*. 2015, 5, 17045.) Furthermore, by employing PVDF-P407-[BMPY][NTf$_2$] ionogel as the electrolyte, the CNF/RGO/MoO$_x$N$_y$ aerogel film-based all-solid-state supercapacitor showed an energy density of 114.0 Wh/kg with a power density of 442 W/kg and maintained at 38.4 Wh/kg at a power density of 13,900 W/kg. The obtained energy density was among the highest values achieved for any type of state-of-the-art solid-state supercapacitor and was even comparable to the energy densities of Li-ion batteries. (See, G. Wang, et al., *Adv Mater*. 2014, 26, 2676; Y. Liu, et al., *Sci Rep-Uk*. 2015, 5, 17045; Y. J. Kang, et al., *ACS Nano*. 2012, 6, 6400; X. Yang, et al., *Adv Funct Mater*. 2013, 23, 33531; Z.-S. Wu, et al., *Adv Mater*. 2012, 24, 5130; J. Zhi, et al., *Nanoscale*. 2016, 8, 11976.) However, the power density of Li-ion batteries is more than an order of magnitude lower than that of the CNF/RGO/MoO$_x$N$_y$ aerogel film-based all-solid-state supercapacitor. (See, P. Simon, et al., *Nat Mater*. 2008, 7, 845.)

Figure 9B:
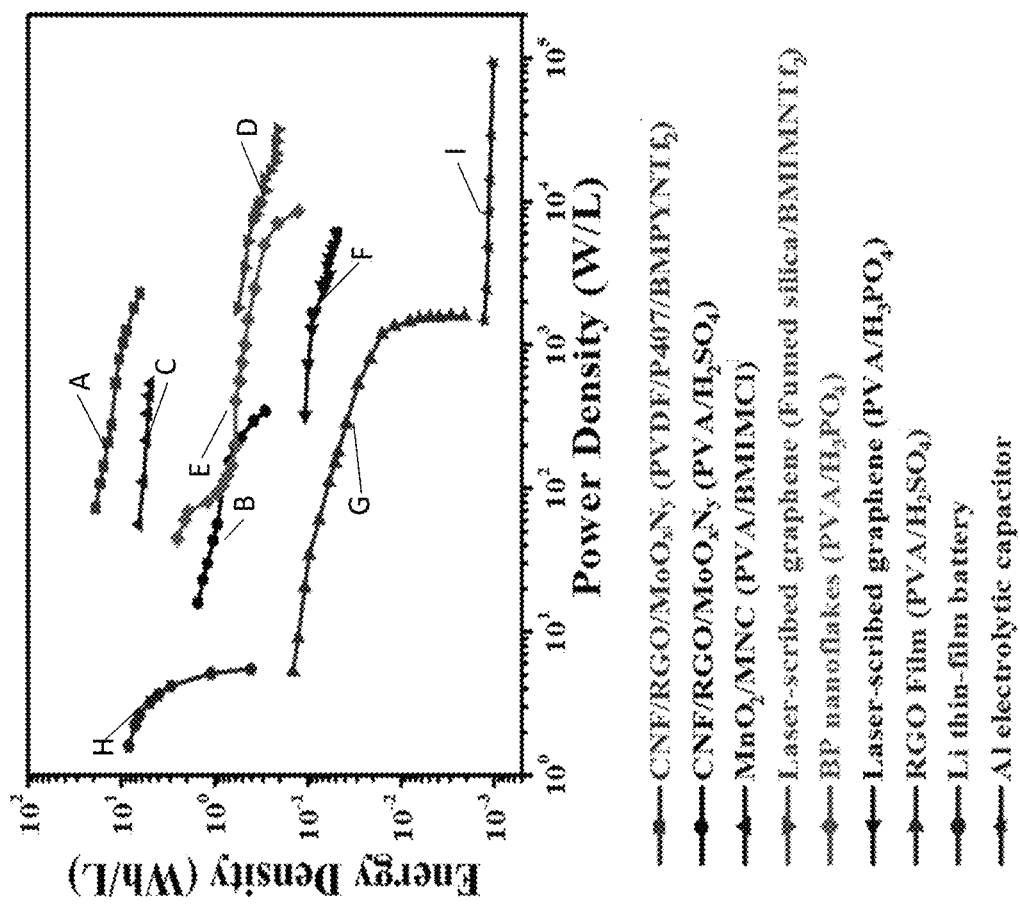
FIG. 9B is a Ragone plot per volume of the all-solid-state supercapacitors employing PVA-H$_2$SO$_4$ hydrogel or PVDF-P407-[BMPY][NTf$_2$] ionogel as the electrolyte, compared with several commercial energy storage systems, as well as supercapacitors previously reported. BNC: bacterial nanocelluose. MNC: macro/mesoporous Ni/C electrode. GA: graphene aerogel. BP: black phosphorous. P(VDF-HFP): poly(vinylidene fluoride-co-hexafluoropropylene).

For easy comparison, the volumetric energy and power densities were also calculated and are presented in FIG. 9B, where the data from a high-energy lithium thin-film battery (4 V/500 µAh) and a high-power aluminum electrolytic capacitor (3 V/300 µf) were also included. (See, M. F. El-Kady, et al., *Science*. 2012, 335, 1326.) The CNF/RGO/MoO$_x$N$_y$ aerogel film-based all-solid-state supercapacitor employing PVDF-P407-[BMPY] [NTf$_2$] ionogel as the electrolyte exhibited a volumetric energy density up to 18.8 Wh/L—a value that is approximately two times higher than that of high-energy lithium thin-film batteries, more than 30 times higher than that of laser-scribed graphene ionogel sandwiched solid-state supercapacitors, and several orders of magnitude higher than that of solid-state supercapacitors employing hydrogel as the electrolyte. (See, W. Liu, et al., *Adv Mater.* 2017, 29, 1603436; M. F. El-Kady, et al., *Nat Commun.* 2013, 4, 1475; C. Hao, et al., *Adv Mater.* 2016, 28, 3194; Z. S. Wu, et al., *Nat Commun.* 2013, 4, 2487.) Although the aluminum electrolytic capacitor (3 V/300 µF) can deliver ultra-high-power density, it has an energy density that is four orders of magnitude lower than that of CNF/RGO/MoO$_x$N$_y$ aerogel film-based all-solid-state supercapacitors employing PVDF-P407-[BMPY][NTf$_2$] ionogel as the electrolyte.

The outstanding electrochemical performance exhibited by the supercapacitors employing the CNF/RGO/MoO$_x$N$_y$ aerogel film electrodes were attributed to several factors: (1) the synergistic electrochemical effect of graphene, based on electric double-layer ion absorption, and pseudocapacitive MoO$_3$, based on fast faradic redox reactions; (2) the aggregation of the graphene was effectively prevented by both the CNFs and the MoO$_x$N$_y$ nanobelts; (3) the partial reduction and nitrogen doping of MoO$_3$ nanobelts, which greatly increase the electrical conductivity and electrochemical stability of the resulting CNF/RGO/MoO$_x$N$_y$ aerogel film electrodes; and (4) the highly open and continuous porous structure of the aerogel film electrode that facilitated ion diffusion and charge transport.

CONCLUSION

In summary, a free-standing, lightweight, highly porous, and highly flexible CNF/RGO/MoO$_x$N$_y$ aerogel film electrode was synthesized by freeze-drying a CNF/GO/MoO$_3$ aqueous dispersion, followed by subsequent in situ hydrazine reduction. It was demonstrated that the partial reduction and nitrogen doping of the MoO$_3$ nanobelts occurred simultaneously with the reduction of GO at a moderate temperature. Supercapacitors made with the CNF/RGO/MoO$_x$N$_y$ aerogel film electrodes exhibited outstanding specific capacitances and remarkable energy densities in different electrolytes, while maintaining the high-power densities and excellent cycle stability. In particular, the CNF/RGO/MoO$_x$N$_y$ aerogel film-based highly flexible and all-solid-state supercapacitors using ionogel as the electrolyte demonstrated an energy density of 114 Wh/kg (corresponding to a volumetric energy density of 18.8 Wh/L), which is among the highest values achieved for any type of solid-state supercapacitor and is even comparable to the energy densities of Li-ion batteries. Therefore, this example illustrates a simple, cost-efficient, and scalable method for fabricating high-performance porous flexible electrodes via a moderate nitrogen doping approach and environmentally friendly freeze-drying process, which can be generalized for the design and fabrication of next-generation flexible energy storage devices with ultra-high energy densities and excellent cycle stabilities.

Methods

Preparation of CNF/RGO/MoO$_x$N$_y$ Aerogel Film Electrodes: GO powder (30 mg) and MoO$_3$ nanobelts (NBs, 30 mg) were first added to deionized water (10 mL). Next, the mixture was sonicated (UP400S, Hielscher USA) at 50% amplitude using a 3 mm probe in an ice-bath for 30 min. CNF solution (4.7 g, 0.85 wt. %) was then added to the above GO/MoO$_3$ dispersion under continuous magnetic stirring at room temperature to yield a homogeneous mixture. The weight percentages of GO, MoO$_3$, and CNFs were 30%, 30%, and 40%, respectively. After being transferred into an aluminum pan, the CNF/GO/MoO$_3$ aerogel was obtained by a freeze-drying process as reported previously. (See, A. Javadi, *Acs Appl Mater Inter.* 2013, 5, 5969; Q. Zheng, *Journal of Materials Chemistry A.* 2014, 2, 3110.) The CNF/GO/MoO$_3$ aerogels were then compressed into aerogel films under a pressure of 1.0 MPa. At the final stage, the CNF/GO/MoO$_3$ aerogel films and a small glass vial containing hydrazine monohydrate (1.0 mL) were placed in a vacuum oven with calcium oxide (CaO) (100 g) at the bottom of the oven. The CNF/GO/MoO$_3$ aerogel films were converted into CNF/RGO/MoO$_x$N$_y$ aerogel films after they were heated in the vacuum oven at 120° C. for 12 h at 85 kPa below atmospheric pressure. For comparison, CNF (40 wt. %)/RGO (60 wt. %) aerogel films were also prepared using the same procedure.

Preparation of PVA-H$_2$SO$_4$ Hydrogel Electrolyte: Following the typical process, H$_2$SO$_4$ (2 mL, 98 wt. %) was first added to deionized water (20 mL). (See, Q. Zheng, et al., *Acs Appl Mater Inter.* 2015, 7, 3263.) Then PVA powder (2.0 g) was added to the solution, and the resulting mixture was subsequently heated to 80° C. under vigorous stirring for 10 h.

Preparation of the PVDF-P407-[BMPY][NTf$_2$] Ionogel Electrolyte: Following the typical process, PVDF powder (80 mg) was first dissolved in DMF (4 mL) at 80° C. under vigorous stirring for 6 h. Poloxamer 407 triblock copolymer (80 mg) and 1-butyl-1-methylpyrrolidinium bis(trifluoromethylsulfonyl)imide ([BMPY][NTf$_2$], 1.84 g) were dissolved in acetonitrile (5.0 mL) and then the mixture was added to the above PVDF DMF solution. The resulting mixture was continuously stirred for another 6 h at 80° C. Afterward, the acetonitrile was removed at 100° C. for 4 h using a vacuum line. The weight percentage of PVDF, P407, and [BMPY] [NTf$_2$] were 4%, 4%, and 92%, respectively.

Preparation of Flexible All-Solid-State Supercapacitors: The CNF/RGO/MoO$_x$N$_y$ aerogel film was cut into pieces (1 cm×2.4 cm in area, 150 wn in thickness). Aluminum foil was affixed to one side of the aerogel film using silver paste, which acted as a current collector and also ensured good electrical contact of the electrode with the electrochemical testing machine. Thereafter, the hot (80° C.) gel electrolyte (i.e., PVA-H$_2$SO$_4$ hydrogel electrolyte or PVDF-P4074-[BMPY][NTf$_2$] ionogel electrolyte, 200 µL electrolyte/cm$^2$ of the electrode) was slowly poured onto the aerogel film. Following a vacuum-assisted liquid filling method, the gel electrolyte completely infiltrated through the porous structure of the aerogel film. Next, the electrode coated with a thin layer of gel electrolyte was left in a fume hood at room temperature for about 12 h to vaporize the solvent (i.e., water or DMF). Finally, two pieces of the resulting aerogel film covered by the electrolyte were then assembled face-to-face into an all-solid-state flexible supercapacitor under a pressure of 0.2 MPa for 10 min, which allowed the gel electrolyte layer on each electrode to merge into one thin separator. For comparison, CNF/RGO aerogel films were also used to prepare the supercapacitors via the same procedure.

Characterization and Electrical Measurements: All tests described in this example were done at least in triplicate, and both the most representative curves and the average results were reported. The densities of the aerogels were calculated by measuring the mass and volume of the aerogels. The microstructures of the aerogels were studied using a scanning electron microscope (SEM, LEO GEMINI 1530) and a transmission electron microscope (TEM, TF-30). Energy-dispersive X-ray spectroscopy (EDS) of the MoO$_3$ NBs after hydrazine vapor reduction were investigated using an FEI Titan TEM with a corrector working at 200 kV. The SEM samples were treated using gold sputtering. TEM samples were prepared by dissolving CNF/RGO/MoO$_x$N$_y$ aerogel film in ethanol under sonication to obtain a uniform dispersion, which was then dropped onto the surface of copper TEM grids. The aerogel samples were compressed using an Instron (Model 5967) equipped with a 30 kN load. Thermal stability measurements were carried out using a thermogravimetric analyzer (TGA, Q50 TA Instruments, USA) from 30 to 800° C. at a 10° C./min heating rate under N$_2$ protection. Elemental analysis was performed on a K-Alpha™+ X-ray Photoelectron Spectrometer (XPS, Thermo Scientific, USA) with focused monochromatic AlKα X-rays (hv=1286.6 eV). X-ray diffraction (XRD) patterns were performed on a D8-Discovery diffractometer (Bruker, USA) with Cu-Kα radiation at a scanning rate of 5°/min. Raman spectra were collected on a DXR™ Raman spectrophotometer (Thermo Scientific, USA) equipped with a 633 nm laser source. The Brunauer-Emmett-Teller (BET) specific surface area was determined by N$_2$ physisorption using a Gemini analyzer (Micromeritics, USA). The electrochemical performances of the aerogel film electrodes were evaluated in both a three-electrode system and a two-electrode solid-state supercapacitor system using cyclic voltammetry (CV) and galvanostatic charge-discharge measurements. All electrochemical tests were carried out on a versaSTAT-3 electrochemical workstation (Princeton Applied Research, USA). For the three-electrode system, a piece of 0.24 cm$^2$ as-prepared aerogel film was used directly as the working electrode. For the aqueous-based three-electrode system, an Ag/AgCl electrode, platinum wire, and 1 M H$_2$SO$_4$ aqueous solution were used as the reference electrode, counter electrode, and electrolyte, respectively. For the ionic liquid (IL)-based three-electrode system, a silver wire, platinum wire, and 50 vol. % [BMPY][NTf$_2$] in acetonitrile solution were used as the quasi-reference electrode, counter electrode, and electrolyte, respectively. Electrochemical impedance spectroscopy (EIS) was performed at open circuit potential with an amplitude of 10 mV over a frequency range of 0.01 Hz to 100 kHz.

Materials: Molybdenum powder (99.5 wt. %, 170 mesh), hydrazine monohydrate (98 wt. %), and 1-butyl-1-methyl-pyrrolidinium bis(trifluoromethylsulfonyl)imide ([BMPY][NTf$_2$]) were purchased from Alfa Aesar. 2,2,6,6-tetramethyl-1-piperidinyloxy (TEMPO, 98 wt. %), potassium permanganate (99 wt. %), hydrogen peroxide solution (30 wt. %), sulfuric acid (98 wt. %), poly(vinyl alcohol) (PVA, Mw: 89 kDa-98 kDa), and poly(vinylidene fluoride) (PVDF, average Mw 534 kDa) were obtained from Sigma Aldrich. Poloxamer 407 (P407, a poly (ethylene glycol)-b-poly(propylene glycol)-b-poly(ethylene glycol) triblock copolymer) was kindly provide by BASF Corporation (Tarrytown, N.Y.). Sodium chlorite, sodium hypochlorite solution, sodium bromide, phosphoric acid, and other chemicals were of laboratory grade (Fisher Scientific, USA) and used without further purification.

Preparation of Cellulose Nanofibrils (CNFs): A commercially supplied, fully bleached eucalyptus Kraft pulp was used to prepare the CNFs by TEMPO-oxidation as previously reported. (See, A. Javadi, et al., *Acs Appl Mater Inter.* 2013, 5, 5969; Q. Zheng, et al., *Acs Appl Mater Inter.* 2015, 7, 3263.) Briefly, fully bleached eucalyptus fibers were oxidized with sodium hypochlorite using TEMPO as a catalyst at a temperature of 60° C. for 48 h. The fibers were then thoroughly washed and refined in a disk refiner with a gap of approximately 200 μm. The coarse fibers were separated by centrifuging at 12,000 G, and the fine CNF dispersion was then concentrated using ultrafiltration. A final refining step was performed in which the nanofiber dispersion was passed through an M-110EH-30 microfluidizer (Microfluidics, Newton, Mass.) once with 200 μm and 87 μm chambers in series. The resulting CNF suspension with a concentration of 0.85% was stored at 4° C. without any treatment before future utilization.

Preparation of Graphene Oxide (GO): Graphene oxide (GO) was prepared from purified natural graphite powder using an improved Hummer's method reported by Marcano. (See, Q. Zheng, et al., *Acs Appl Mater Inter.* 2015, 7, 3263; D. C. Marcano, et al., *ACS Nano.* 2010, 4, 4806.) Briefly, graphite flakes (2.0 g) and KMnO4 (12.0 g) were slowly added into a mixture of concentrated H$_2$SO$_4$/H$_3$PO$_4$ (180 ml:20 ml) and then stirred at 50° C. for 12 h. Afterward, the mixture was cooled to room temperature and then poured onto a mixture of ice (~200 ml) with H$_2$O$_2$ solution (2 ml, 30 wt. %). The mixture was centrifuged (10,000 rpm for 15 min), and the supernatant was decanted. The remaining solid material was then washed in succession with water, 30% HCl, ethanol, and water. For each wash, the filtrate was centrifuged (10,000 rpm for 15 min) and the supernatant was decanted. The remaining solid was further purified by dialysis against DI water for 3 days. The solution after dialysis was freeze-dried for 24 h to obtain the GO (3.6 g).

Preparation of Ultralong Molybdenum Trioxide Nanobelts (Moos): The ultralong molybdenum trioxide was prepared using a modified hydrothermal method as previously reported. (See, B. Yao, et al., *Adv Mater.* 2016, 28, 6353.) To be specific, 1 g of molybdenum powder was added into 10 mL deionized water to form a uniform dispersion via the aid of sonication. Afterward, 10 mL 30% (wt %) H$_2$O$_2$ was slowly added and the solution was continuously stirred for 30 min to react thoroughly. After being transferred to a Teflon-lined stainless steel autoclave, the resulting mixture was heated in a vacuum oven at 220° C. for 7 days. The precipitate was then filtered and washed with water and ethanol several times until the solution became clear. The solid material was freeze-dried for 24 h to obtain the MoO$_3$ (1.48 g).

Electrochemical Characterization: The electrochemical parameters were calculated as follows. (See, Y. Shao, et al., *Adv Mater.* 2016, 28, 6719; K. Zhou, et al., *Nano Energy.* 2015, 12, 510.)

For the three-electrode system, the specific capacitances of the electrodes were calculated from their CV curve at different scan rates and galvanostatic charge-discharge curves at different current densities using Equations (S1) and (S2), respectively, $$C_{s,M} = \frac{\int I \times dV}{v \times M_1 \times \Delta V} \quad (S1)$$

$$C_{s,M} = \frac{I \times \Delta t}{M_1 \times \Delta V}. \quad (S2)$$

For solid-state supercapacitors, the specific capacitances of the electrodes were calculated based on the mass or area or volume from the galvanostatic charge-discharge curves at different current densities using the following equations.

$$C_{s,M} = 2 \times \frac{I \times \Delta t}{M_2 \times \Delta V} \quad (S3)$$

-continued $$C_{s,S} = 2 \times \frac{I \times \Delta t}{S \times \Delta V} \quad (S4)$$

$$C_{s,V} = 2 \times \frac{I \times \Delta t}{V \times \Delta V} \quad (S5)$$

For solid-state supercapacitors, the specific capacitances of the electrodes can also be calculated based on the mass from CV curves at different scan rates using the following equation.

$$C_{s,M} = 2 \times \frac{\int I \times dV}{v \times M_2 \times \Delta V} \quad (S6)$$

The capacitance of a solid-state supercapacitor was calculated according to the following equations.

$$C_{device,M} = \frac{1}{4} C_{s,M} = \frac{1}{2} \times \frac{I \times \Delta t}{M_2 \times \Delta V} \quad (S7)$$

$$C_{device,S} = \frac{1}{2} C_{s,S} = \frac{I \times \Delta t}{S \times \Delta V} \quad (S8)$$

$$C_{device,V} = \frac{1}{4} C_{s,V} = \frac{1}{2} \times \frac{I \times \Delta t}{V \times \Delta V} \quad (S9)$$

The energy density and power density of the solid-state supercapacitor was calculated according to Equation (S10) and Equation (S11), respectively, $$E_{device} = \frac{C_{device} \times (\Delta V)^2}{2 \times 3600} \quad (S10)$$

$$P_{device} = \frac{E_{device} \times 3600}{\Delta t} \quad (S11)$$

where I is the applied current, v is the scan rate, and $\Delta t$ is the discharge time of the galvanostatic charge/discharge curves, and $\Delta V$ is the operating voltage window from the discharge curve excluding the IR drop. $M_1$ and $M_2$ are the weight of a single electrode in the three-electrode system and symmetric two-electrode solid-state system, respectively. S and V are the area and volume of a single electrode in solid-state supercapacitor, respectively.

For the solid-state supercapacitors, the area made accessible to the electrolyte was 2.4 cm$^2$, corresponding to a mass of 6.0 mg of the active materials (RGO and $MoO_xN_y$) per electrode. The areal density and volumetric density of the active materials were calculated to be 2.5 mg/cm$^2$ and 165 mg/cm$^3$ per electrode, respectively.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An electrically conductive film comprising an aerogel comprising reduced graphene oxide particles and pseudocapacitive metal oxynitride fibers, wherein the pseudocapacitive metal oxynitride fibers comprise molybdenum oxynitride fibers.

2. The film of claim 1, wherein the aerogel further comprises cellulose nanofibrils.

3. The film of claim 2, wherein the aerogel is a freestanding aerogel.

4. The film of claim 2, wherein the aerogel has a cellulose nanofibril content in the range from 20 weight percent to 60 weight percent.

5. The film of claim 4, wherein the aerogel comprises from 40 weight percent to 80 weight percent of a mixture of the reduced graphene oxide particles and pseudocapacitive metal oxynitride fibers.

6. The film of claim 1, wherein the weight ratio of reduced graphene oxide particles to pseudocapacitive metal oxynitride fibers in the aerogel is in the range from 3:1 to 1:3.

7. The film of claim 1, wherein the molybdenum oxynitride fibers are molybdenum oxynitride nanobelts.

8. A supercapacitor comprising:
a first electrode;
a second electrode, wherein at least one of the first electrode and second electrode comprises an electrically conductive film comprising an aerogel comprising reduced graphene oxide particles and pseudocapacitive metal oxynitride fibers, wherein the pseudocapacitive metal oxynitride fibers comprise molybdenum oxynitride fibers; and
an electrolyte disposed between and in contact with the first electrode and the second electrode.

9. The supercapacitor of claim 8, wherein the electrolyte comprises an ionic liquid.

10. The supercapacitor of claim 9, wherein the electrolyte is an ionogel comprising the ionic liquid held within a polymer matrix.

11. The supercapacitor of claim 9, wherein the ionic liquid is [BMPY] [NTf2].

12. The supercapacitor of claim 10, wherein the polymer matrix comprises a poloxamer.

13. The supercapacitor of claim 8, wherein the aerogel further comprises cellulose nanofibrils.

14. The supercapacitor of claim 8, wherein the molybdenum oxynitride fibers are molybdenum oxynitride nanobelts.

* * * * *

UNITED STATES PATENT AND TRADEMARK OFFICE
CERTIFICATE OF CORRECTION

PATENT NO. : 10,676,363 B2
APPLICATION NO. : 15/901352
DATED : June 9, 2020
INVENTOR(S) : Shaoqin Gong et al.

Page 1 of 1

It is certified that error appears in the above-identified patent and that said Letters Patent is hereby corrected as shown below:

In the Specification

Column 16, Line 62:
Delete the phrase "(3 V/300 μf)" and replace with --(3 V/300 μF)--.

Column 18, Line 38:
Delete the phrase "(1 cm × 2.4 cm in area, 150 wm in thickness)." and replace with --(1 cm × 2.4 cm in area, 150 μm in thickness).--.

Column 18, Line 43-44:
Delete the phrase "PVDF-P4074-[BMPY][NTf$_2$]" and replace with --PVDF-P407-[BMPY][NTf$_2$]--.

Column 20, Line 26-27:
Delete the phrase "Preparation of Ultralong Molybdenum Trioxide Nanobelts (Moos):" and replace with --Preparation of Ultralong Molybdenum Trioxide Nanobelts (MoO$_3$):--.

Signed and Sealed this
Twenty-ninth Day of September, 2020

Andrei Iancu
*Director of the United States Patent and Trademark Office*